United States Patent [19]

Kelly et al.

[11] 4,021,624
[45] May 3, 1977

[54] AUTOMATIC CALL GENERATOR

[75] Inventors: Patrick M. Kelly, Victor; Alton Dorazio, East Rochester, both of N.Y.

[73] Assignee: Stromberg-Carlson Corporation, Rochester, N.Y.

[22] Filed: Oct. 23, 1975

[21] Appl. No.: 625,058

[52] U.S. Cl. .................. 179/175.2 D; 179/175.2 R
[51] Int. Cl.² ........................................ H04M 3/24
[58] Field of Search ............. 179/175.2 D, 175.2 R, 179/175.23, 175.2 C

[56] References Cited
UNITED STATES PATENTS

| | | | |
|---|---|---|---|
| 3,239,612 | 3/1966 | McAllister | 179/175.2 D |
| 3,497,639 | 2/1970 | Malinich et al. | 179/175.2 R |
| 3,515,820 | 6/1970 | Bereznak | 179/175.2 D |
| 3,692,961 | 9/1972 | Le Strat et al. | 179/175.2 D |
| 3,692,962 | 9/1972 | Raczynski et al. | 179/175.2 R |
| 3,700,830 | 10/1972 | Naylor et al. | 179/175.2 D |
| 3,778,556 | 12/1973 | Mees et al. | 179/175.2 R |

*Primary Examiner*—Douglas W. Olms
*Attorney, Agent, or Firm*—Donald R. Antonelli; William F. Porter, Jr.

[57] ABSTRACT

An automatic call generator is connectable with the main distribution frame of a common control telephone system and monitors the operation of the system. To this end, the automatic call generator is connected to dedicated line and trunk circuit ports and attempts to place calls from one dedicated spot to another. If the system fails to terminate a call within a prescribed period of time, a malfunction is noted. Two malfunctions within a prescribed set of programs for monitoring the system cause a system alarm to be generated. The call generator also tests itself after proceeding through assigned programs for monitoring the system.

17 Claims, 21 Drawing Figures

SYSTEM BLOCK DIAGRAM

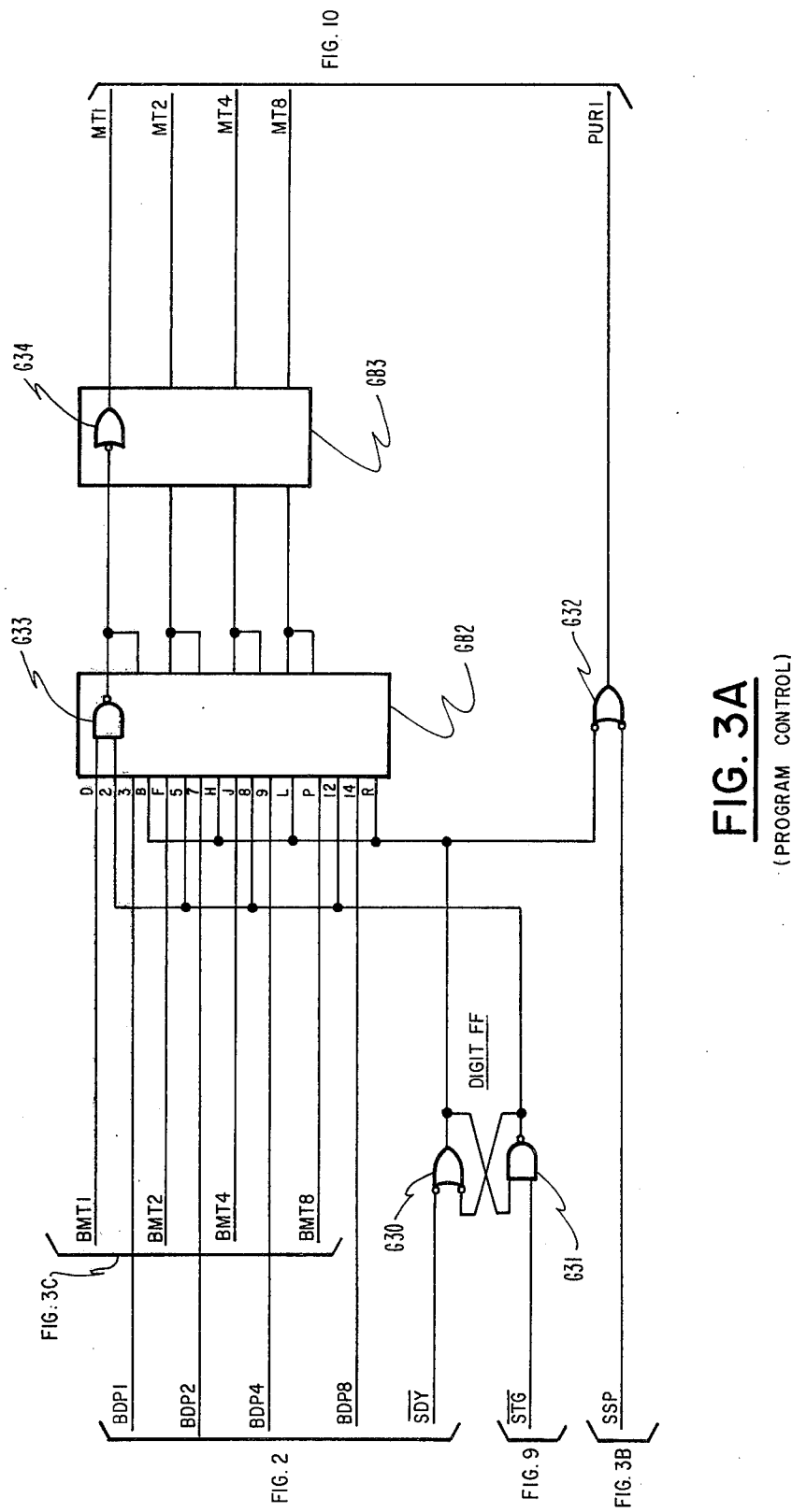

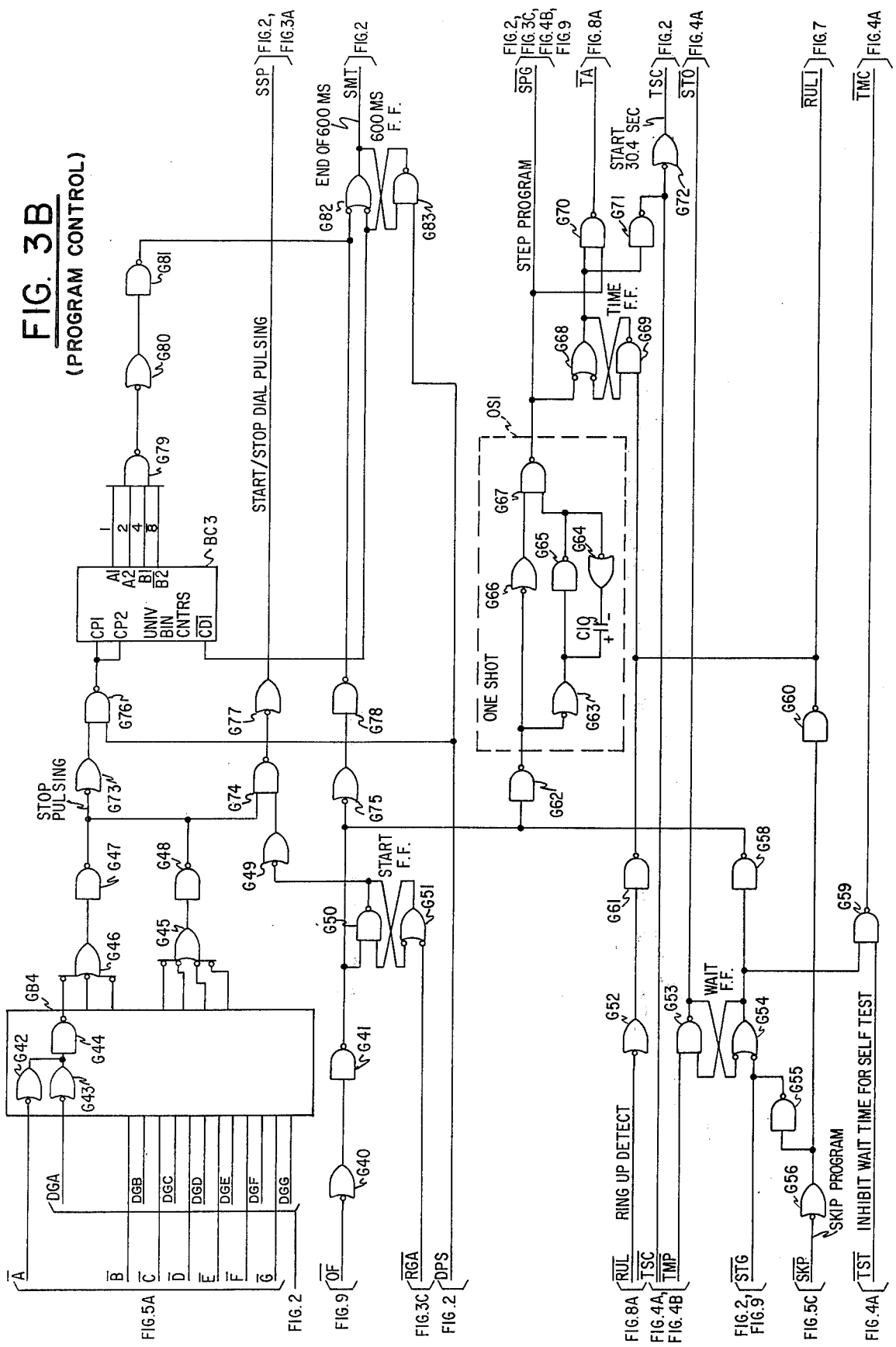
FIG. 3B (PROGRAM CONTROL)

(PROGRAM CONTROL)

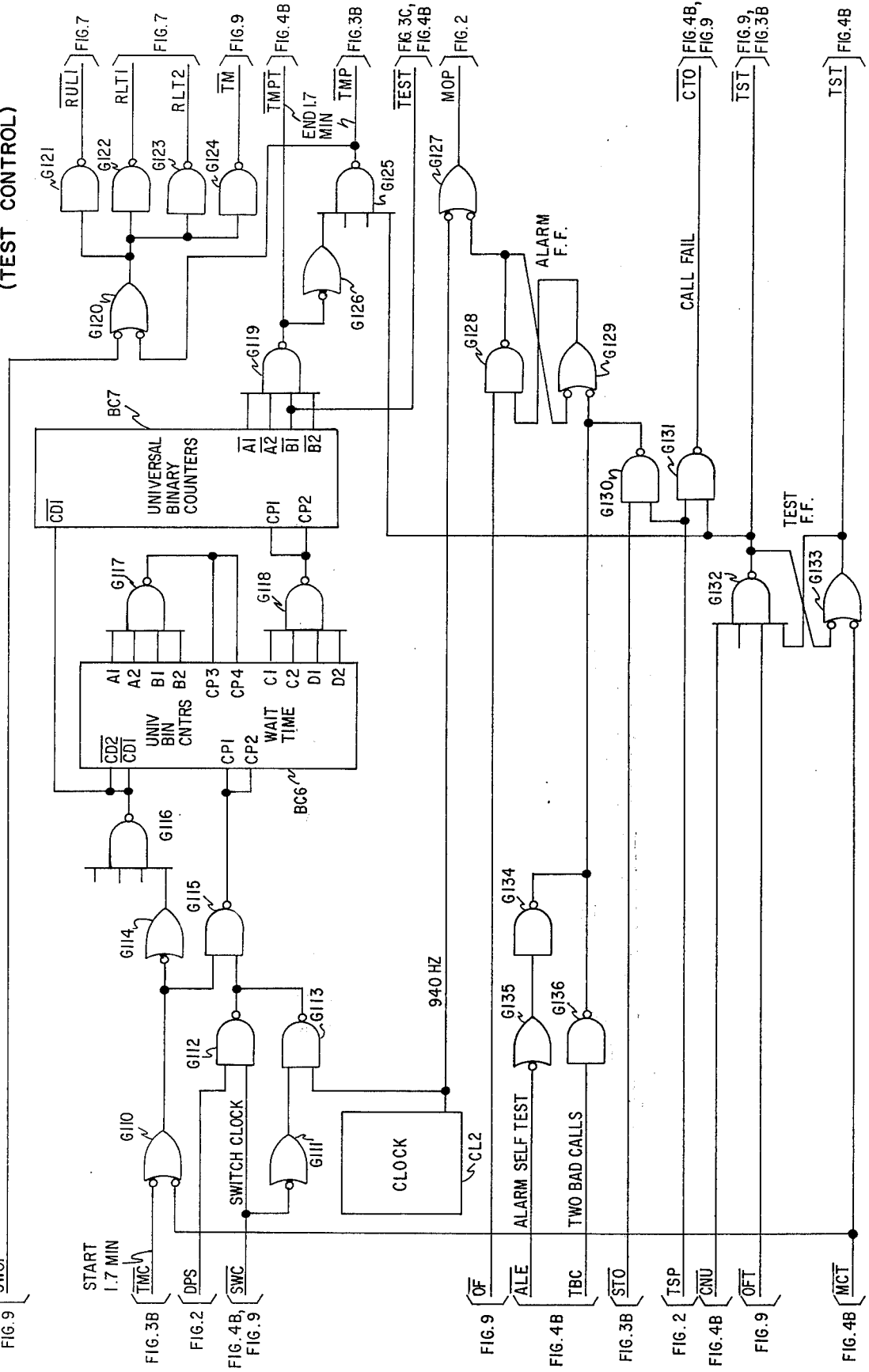

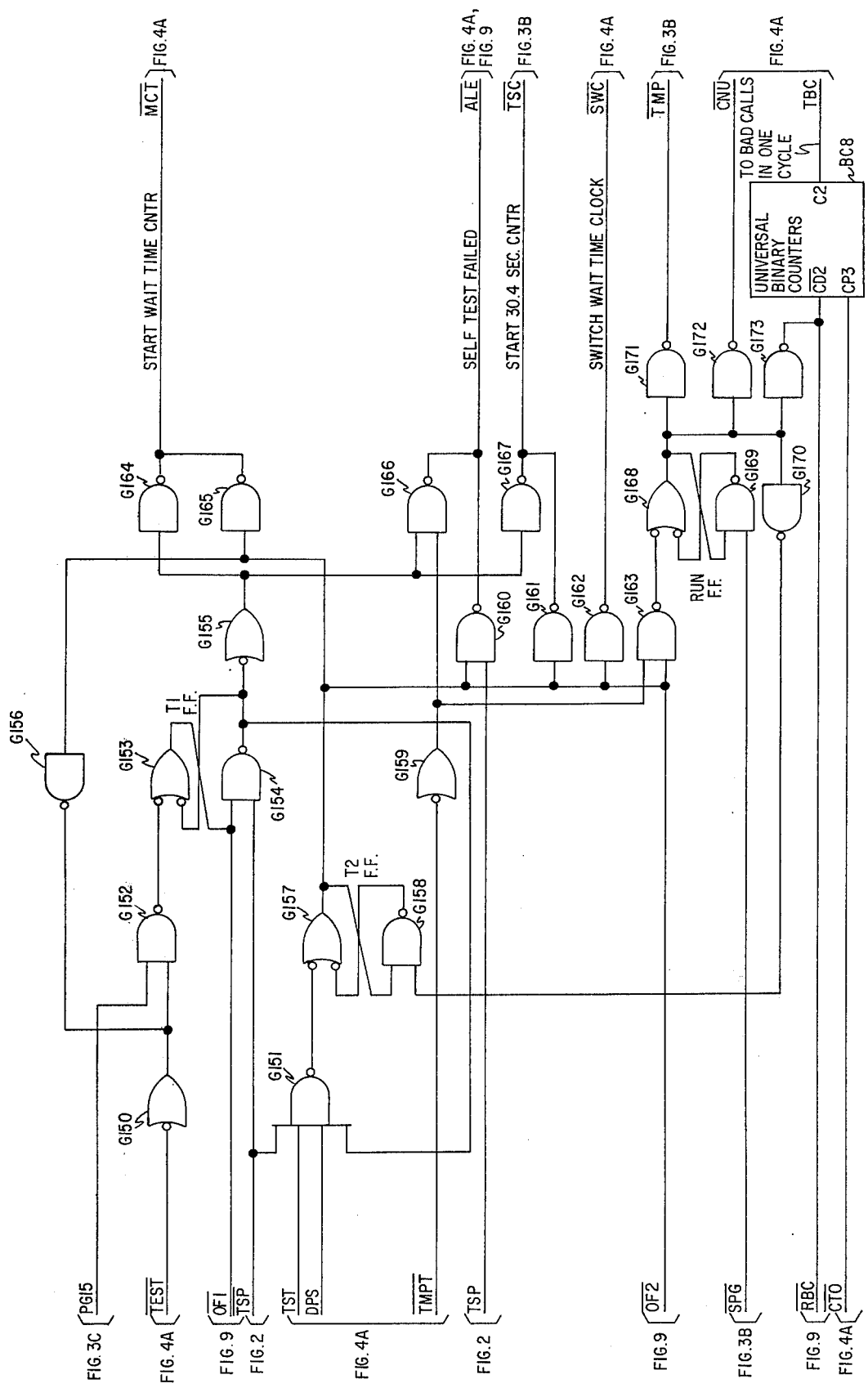

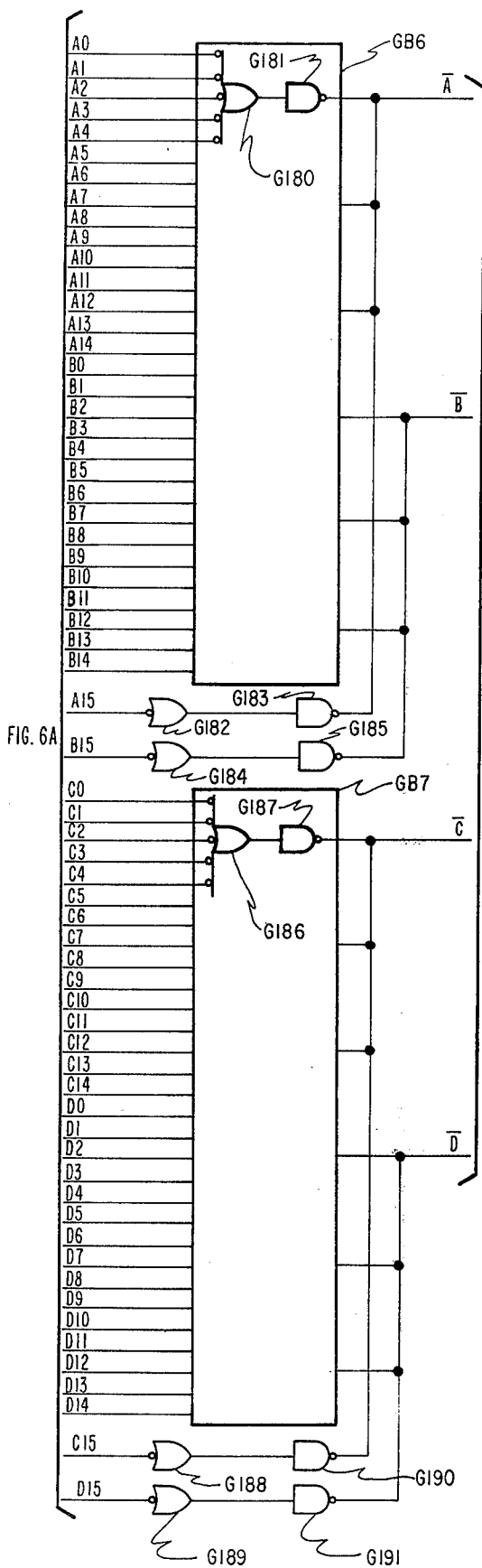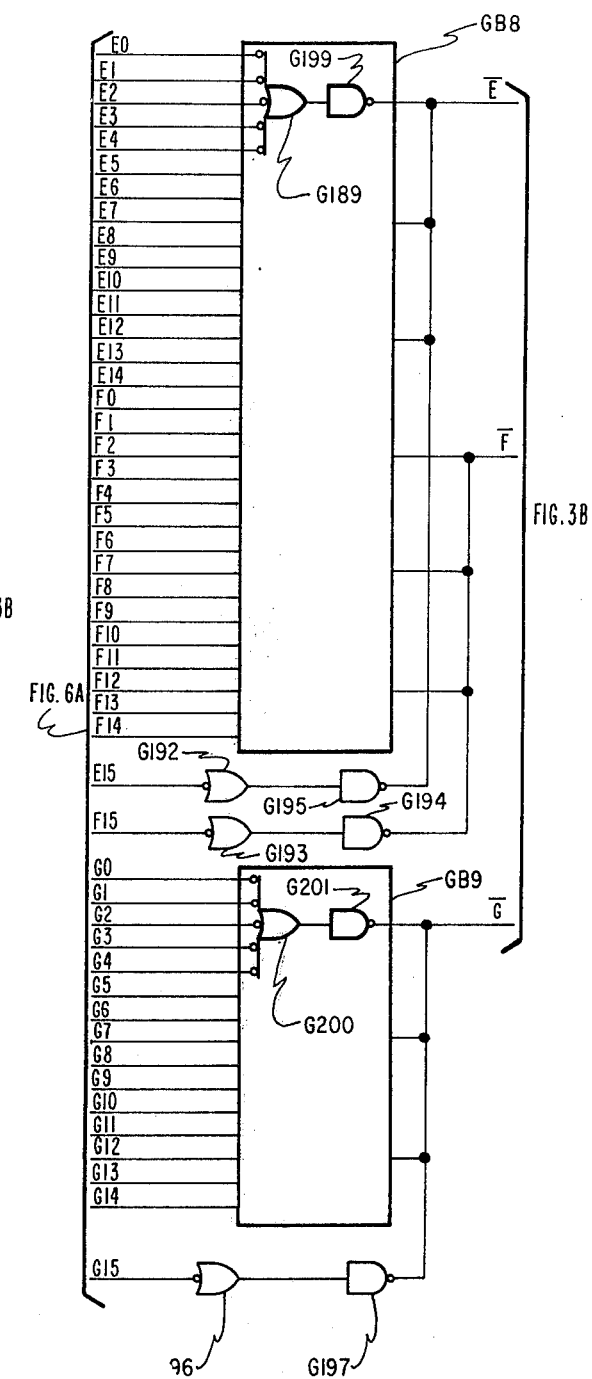
FIG. 5A
(PROGRAM SELECTOR)

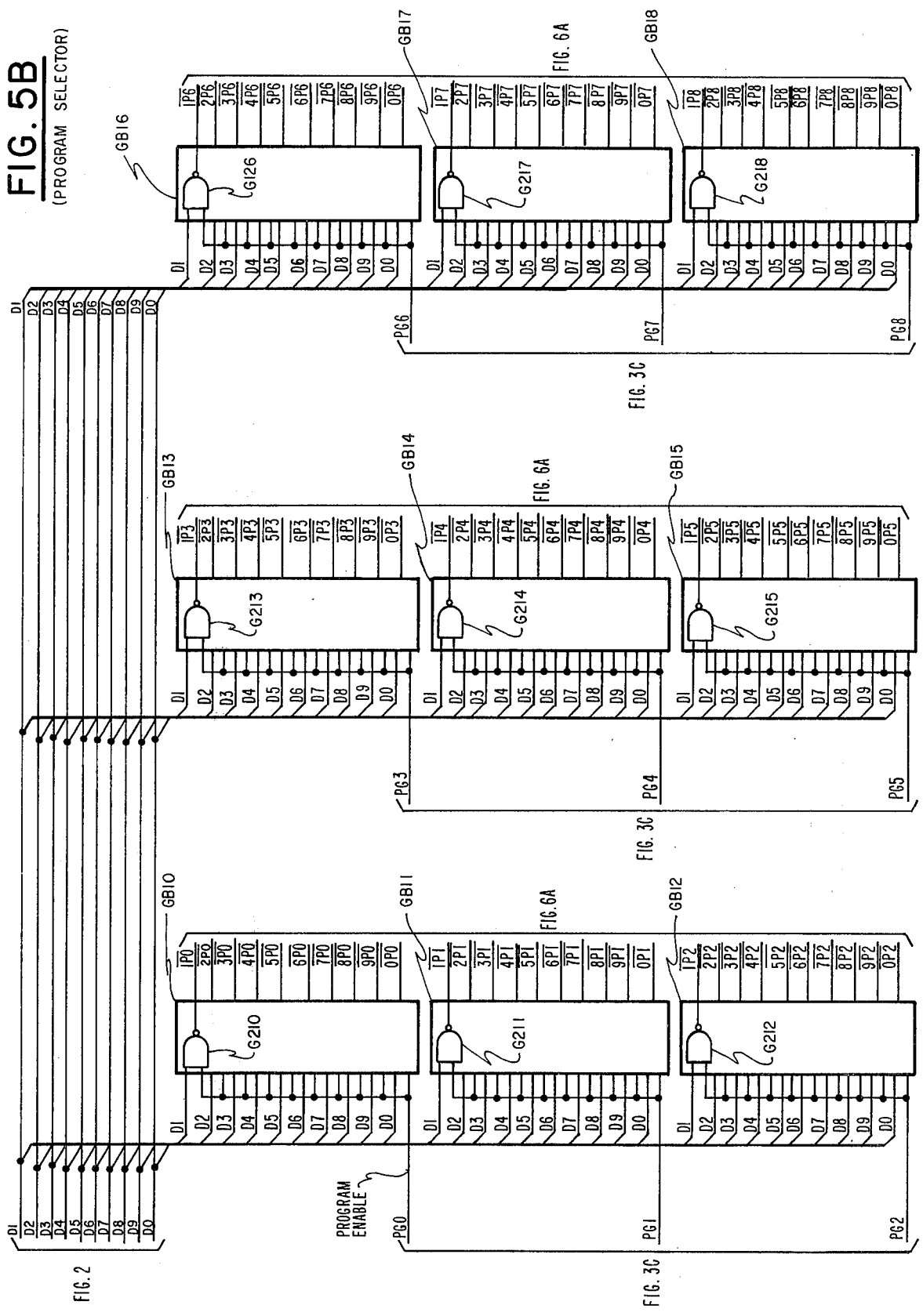
FIG. 5B (PROGRAM SELECTOR)

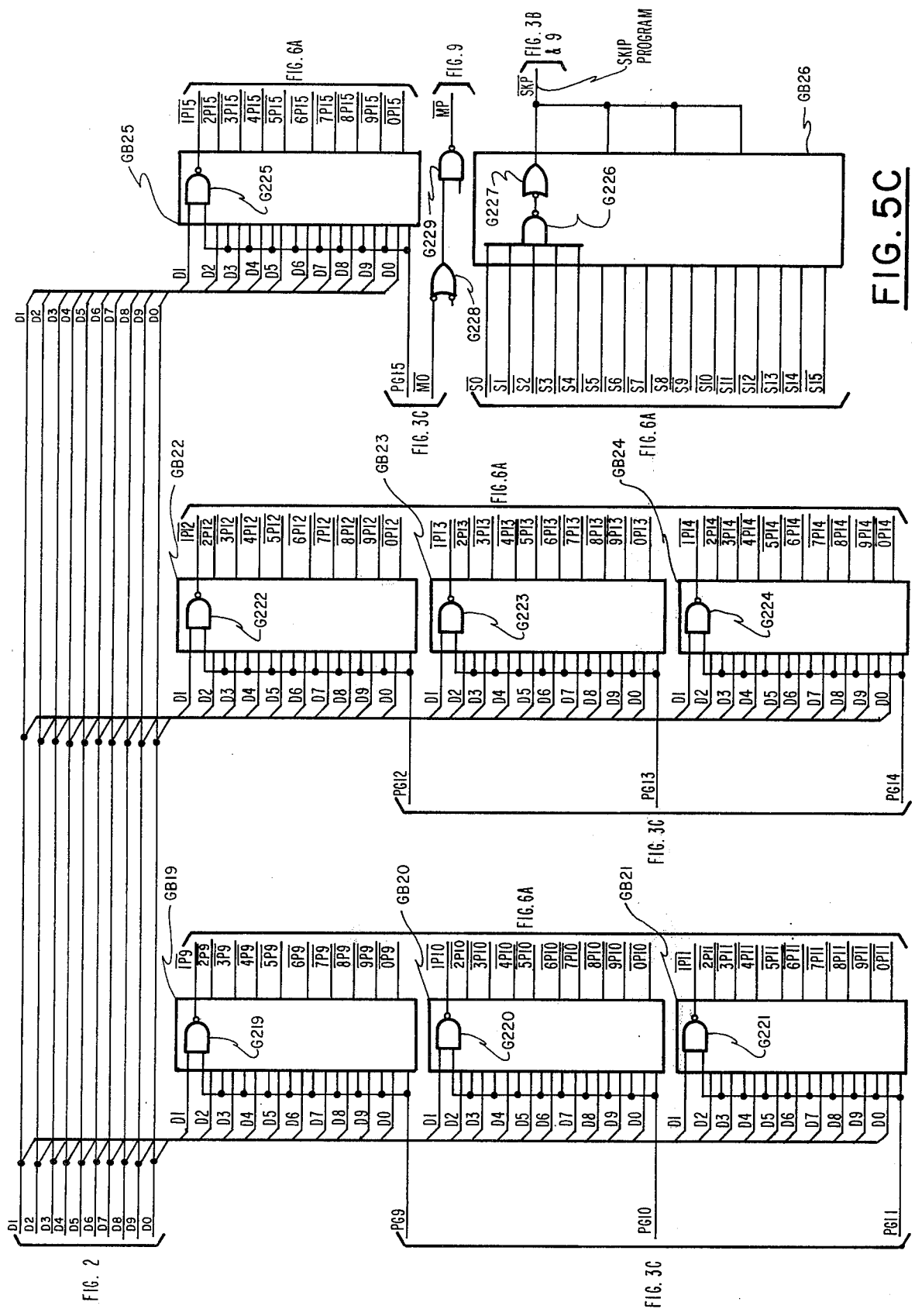

FIG. 6B TRUNK SIGNALING STRAPPING PANEL

FIG. 6A PROGRAM NUMBER STRAPPING PANEL (PORT SELECTOR)

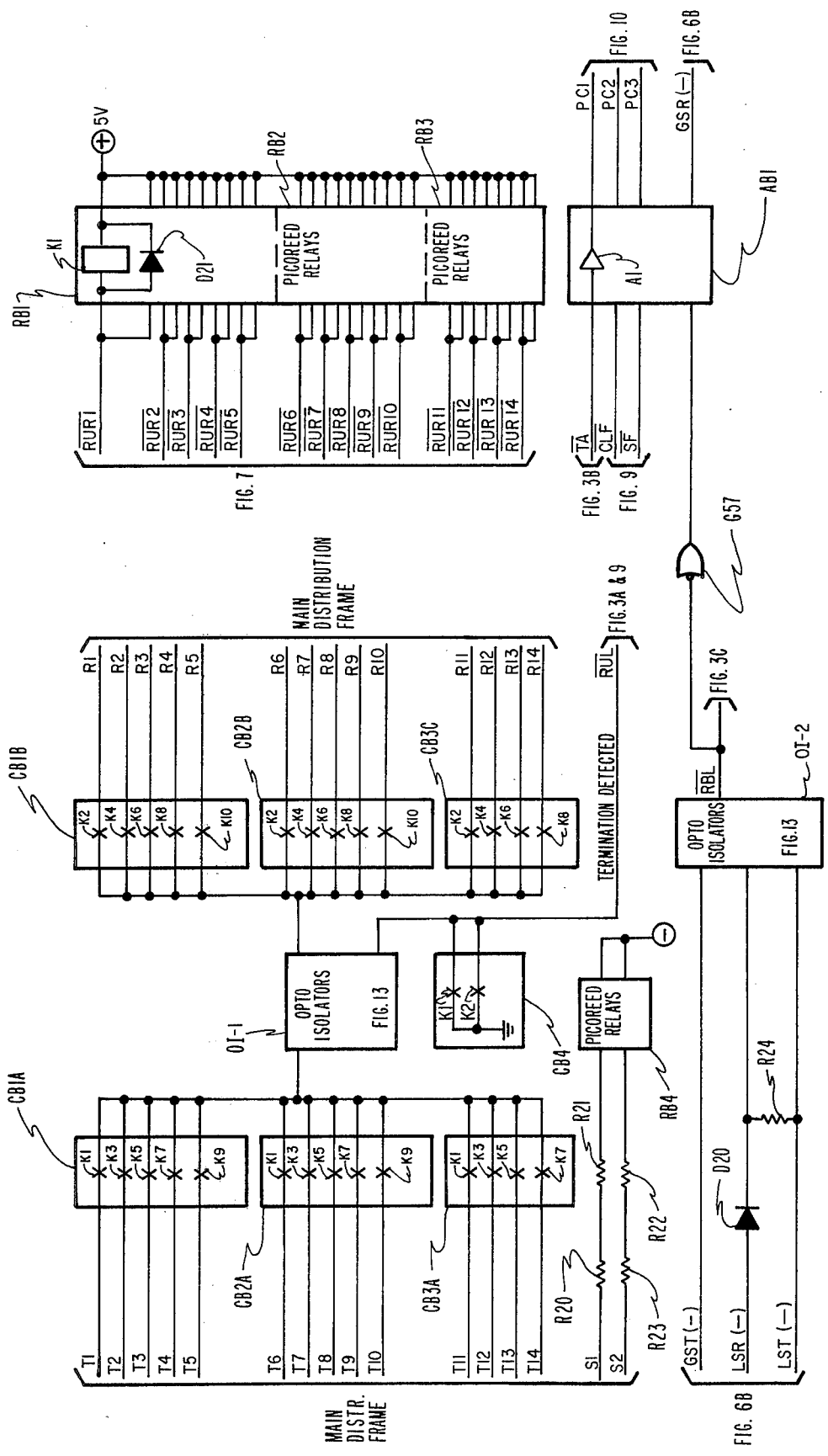
FIG. 8A (LINE / TRUNK ACCESS)

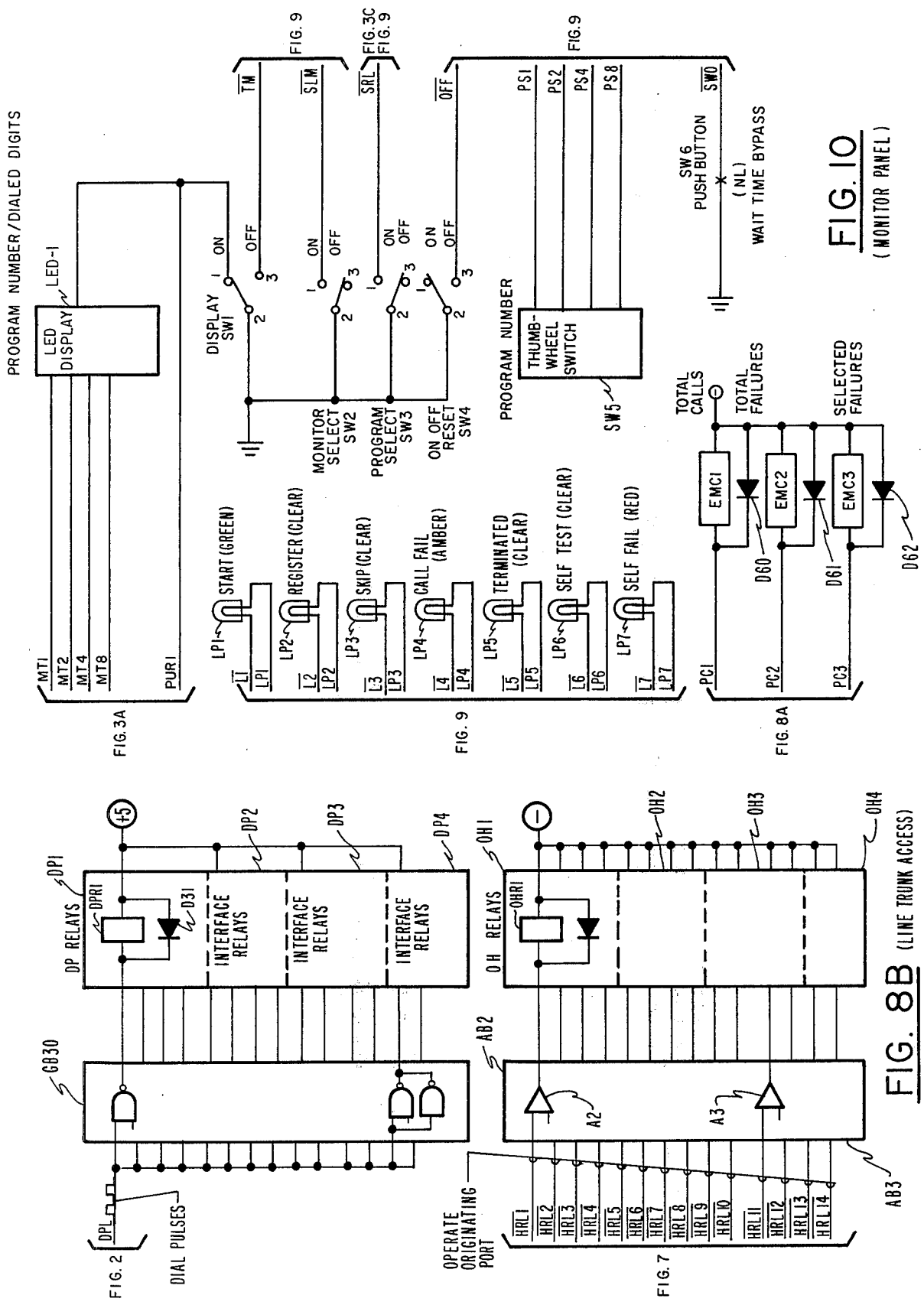

(MONITOR PANEL CONTROL)

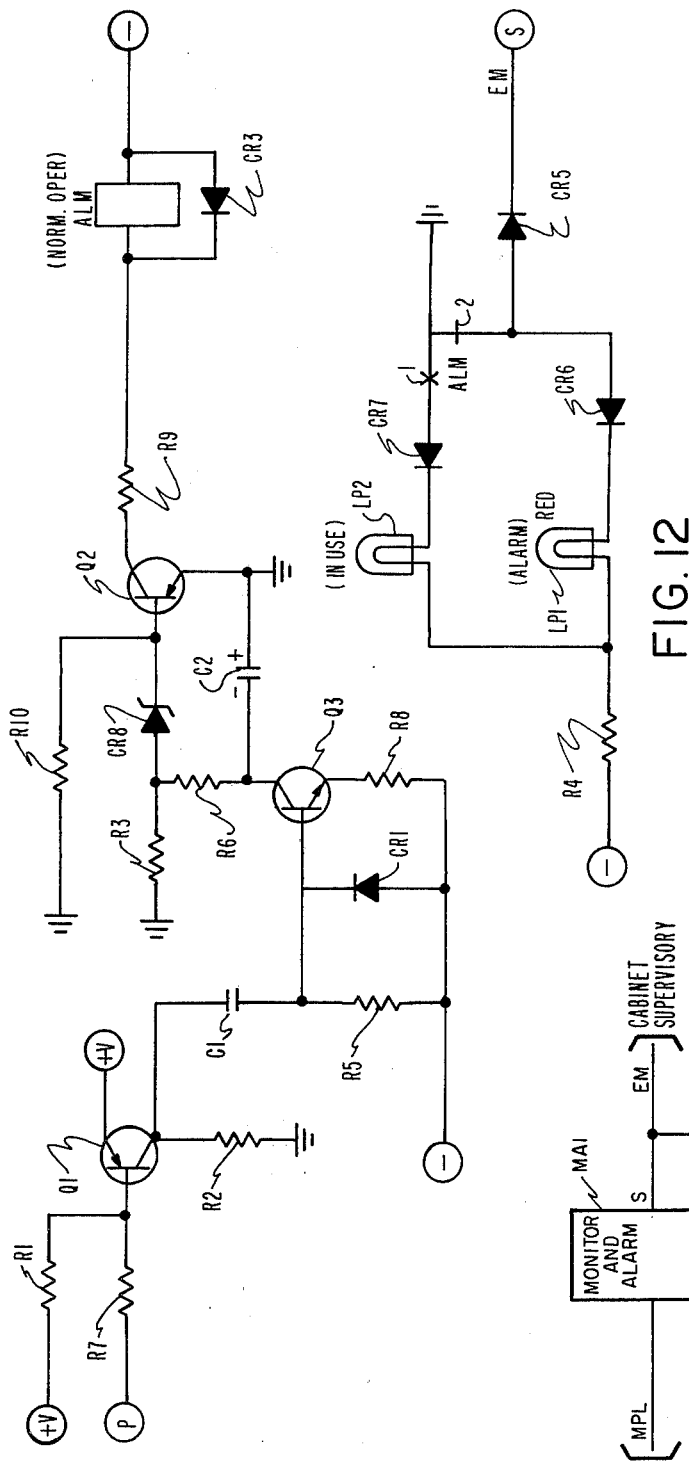

AUTOMATIC CALL GENERATOR

FIELD OF THE INVENTION

The present invention relates in general to telephone systems and, in particular, to an arrangement for testing the ability of a common control telephone system to carry out the functions required for connecting an originating calling party to a terminating called party.

BACKGROUND OF THE INVENTION

In common control type telephone systems, wherein the communication path between calling and called parties is set up by the common control portion of the equipment, it is of vital importance that any malfunction of the common control be quickly detected and identified, in order to minimize any resulting interruption in service. While malfunctions are usually readily noticeable during continuous use of the system, in some offices, such as those which provide telephone service for small communities, the use of the system may be reduced significantly during evening and early morning hours, and considerable periods of time may elapse between requests for service from the system and the attendant control functions carried out by the common control. A malfunction of the common control during these minimal use periods may continue unnoticed until traffic begins to pick up during the morning hours, with the result that, when a sudden demand for connection service from the system common control occurs, nothing yet has been done to correct the malfunction, and the service to be provided by the system must often be interrupted to detect and correct the problem at the time when the demand for service is high.

Unfortunately, the common control portion of the system is usually a hardwired special purpose computer, and the circuitry which would be necessary to test each portion of the common control would be prohibitively expensive, to say the least.

SUMMARY OF THE INVENTION

In accordance with the present invention there is provided a system which can continuously monitor the ability of the common control portion of the equipment to correctly place a call. To this end, the system is coupled to the main distribution frame portion of the common control telephone system to be monitored where originating and terminating connection ports are available. Rather than check each individual portion of the common control, the present invention simply tests the ability of the common control to place a call. If the common control fails to perform its intended function, then it can be logically presumed that some portion of the common control is defective. The invention is capable of automatically generating calls which are to originate at preselected line or incoming trunk circuits and terminate at other preselected line or outgoing trunk circuits. Since this automatic call generator is connected to preselected ports, if, for any reason, the common control does not provide a connection between the originating ports and the terminating port, the system notes this as a malfunction of the common control.

When placing calls, the automatic call generator is operated to signal an alarm in response to the occurrence of two malfunctions within a set of programs used for testing the system. Moreover, after this set of programs has been completed, the automatic call generator performs tests on itself in order to be certain that the ability of the common control to place a call is being properly monitored.

In order to fully monitor the ability of the common control to place a call, the automatic call generator may employ up to 16 programs which cause calls to be selectively generated at line circuits or incoming trunks and terminated at line circuits or outgoing trunks. Each program is selectively strappable within the generator, and a selected number of ports on the main distribution frame are dedicated to the automatic call generator (herein referred to as ACG). For line circuit termination seven dialed digits are generated and detected; dedicated outgoing trunks have their sleeve leads tied to the ACG.

Although the common control will normally establish a communication path between originating and terminating ports within an extremely short period of time (hundreds of milliseconds, the ACG allows the common control approximately 30 seconds to complete the call for each program. A period of approximately 1.7 minutes is allotted between programs, so that in its automatic mode, the ACG is capable of testing the common control nearly every two minutes.

While sixteen test programs are selectively available, any program can be skipped by means of the strapping panel. Also, the system can be operated in either manual or automatic modes.

BRIEF DESCRIPTION OF THE DRAWINGS

FIGS. 3A-3C show, in detail, the circuitry employed in the program control portion of the system block diagram of FIG. 1;

FIGS. 4A-4B show, in detail, the circuitry employed in the test control portion of the system block diagram of FIG. 1;

FIGS. 5A-5C show, in detail, the circuitry employed in the program selector portion of the system block diagram of FIG. 1;

FIGS. 6A-6B show the details of the strapping panels employed in the present invention;

FIGS. 8A-8C show, in detail, the circuitry employed in the line/trunk access portion of the system block diagram of FIG. 1;

FIG. 10 shows the details of the circuitry of the monitor panel portion of the system block diagram of FIG. 1;

FIGS. 11 and 12 show the details of the monitor and alarm portions of the system block diagram of FIG. 1; and FIG. 13 depicts the details of the opto-isolator circuitry employed in the line/trunk access illustrated in FIG. 8.

DETAILED DESCRIPTION

Figure 1:
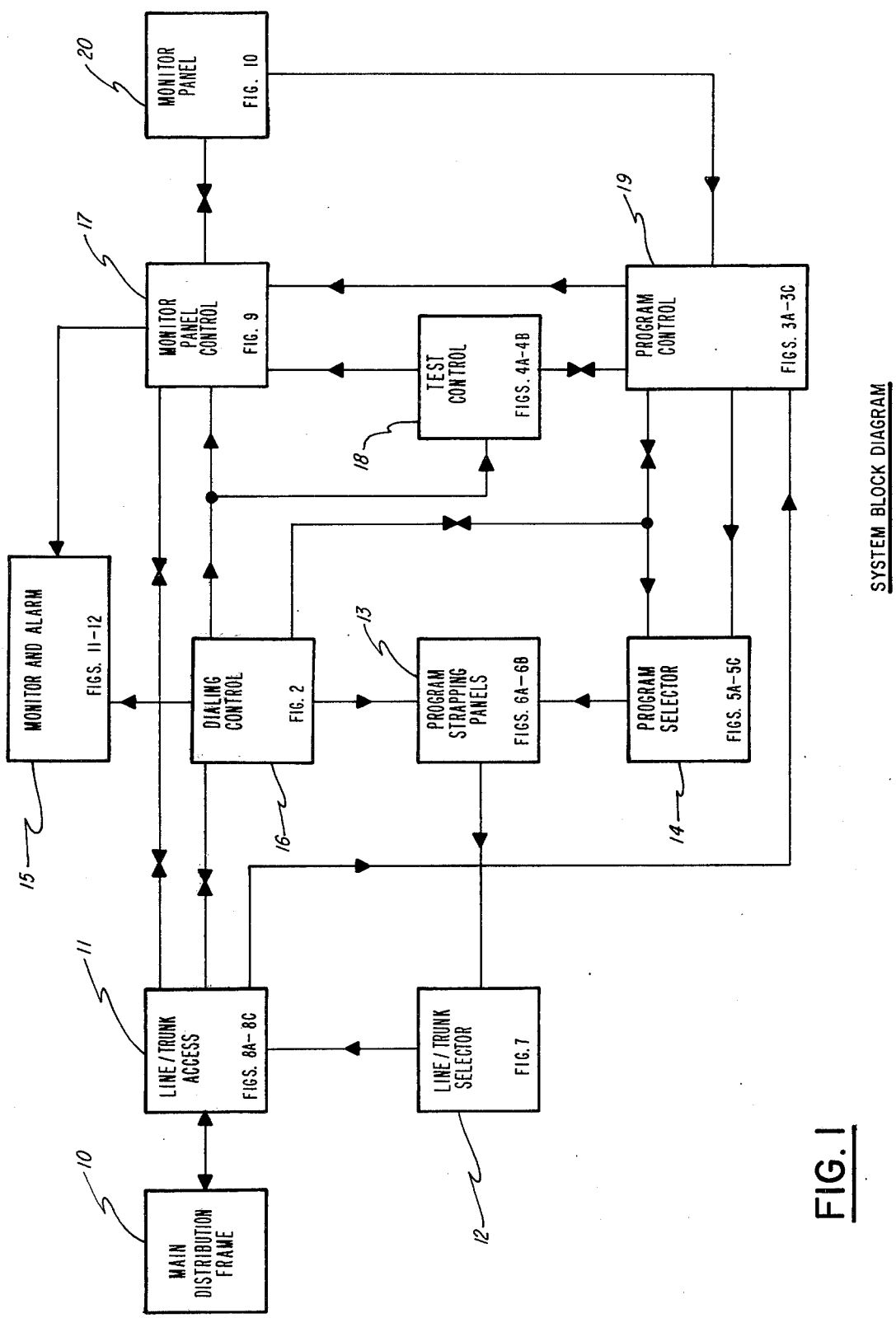
FIG. 1 is a block diagram of the automatic call generator in accordance with the present invention.

FIG. 1 shows the basic components of the automatic call generator of the present invention in block diagram form, the details of which will be described in conjunction with FIGS. 2–13. Since the present invention is essentially independent of the common control telephone system being monitored, only a minimal amount of interconnection circuitry is required. More specifically, the ACG is connected to dedicated line and trunk ports on the MAIN DISTRIBUTION FRAME 10 of the common control telephone office to be monitored by way of the LINE/TRUNK ACCESS 11 of FIG. 8, which comprises sets of relay circuits for establishing connections to seize the lines and trunks via tip and ring leads and connect them to the ACG.

The LINE/TRUNK SELECTOR 12 comprises the logic circuitry necessary for selectively energizing the appropriate relay circuits within the LINE/TRUNK ACCESS 11 for enabling the ACG to actually make the call between particular line and/or trunk circuits. The DIALING CONTROL 16 comprises a 10 pps generator and a monitor circuit and dials a directory number in accordance with prescribed strapping of a particular directory number for an individual program on the PROGRAM STRAPPING PANELS 13. As each digit is dialed, the DIALING CONTROL 16 advances to the next digit strapped on the PROGRAM STRAPPING PANELS 13 until seven complete digits have been dialed. The recognition of each complete digit is carried out by counting pulses generated by the 10 pps generator which are divided down in the DIALING CONTROL 16. Once the call has been terminated or has failed to terminate within a prescribed period of time, the PROGRAM SELECTOR 14 advances to the next program to be run (or skipped).

The TEST CONTROL 18 contains circuitry for carrying out self testing of the ACG to ensure that the operation of the common control equipment is being properly monitored. The TEST CONTROL 18 carries out a pair of self tests at the end of the sixteenth program. Each self test effectively checks the proper operation of the counters employed to control the allowed 30 second termination period of a call and the 1.7 minute period between programs. A failure of one of the counters will signal an alarm.

The MONITOR PANEL 20 and MONITOR PANEL CONTROL 17 constitute a lamp display and driver logic, respectively, used to monitor the progress of any particular call. The digits of a directory number are displayed as they are being dialed and control of the call can be controlled by manual intervention. MONITOR AND ALARM 15 is connected to the MONITOR PANEL CONTROL 17 and the DIALING CONTROL 16 to detect alarm signals and supply an emergency alarm signal to the cabinet supervisory portion of the office being monitored.

The PROGRAM CONTROL 19 operates in conjunction with PROGRAM SELECTOR 14 to provide the proper dialed digits as preset on the PROGRAM STRAPPING PANELS 13. PROGRAM CONTROL 19 is a scanner associated with a set of enabling gates within the PROGRAM SELECTOR 14 to effect the proper dialing of the digits as strapped on the PROGRAM STRAPPING PANELS 13.

For a better understanding of the ACG, the components and operation of the system will be described in conjunction with FIGS. 2–13, which show the details of the block function elements discussed above in connection with FIG. 1. The sequence of operations which take place in the ACG will be more readily understood if the basic FIGS. 2–11 are laid out in the manner shown in FIG. 1.

EXTERNAL CONTROL MONITOR PANEL

As was mentioned previously, external monitoring and control of the ACG is effected by way of the MONITOR PANEL, shown in FIG. 10. On the panel there are a plurality of lamps LP1–LP7 with respective leads L1–LP1 . . . L7–LP7 respectively connected to the MONITOR PANEL CONTROL in FIG. 9, as shown. Power (+V) is supplied via resistor network RN2 over leads LP1–LP7, while selection leads $\overline{L1}$–$\overline{L7}$ supply the necessary drive signals from latching lamp driver circuit LDC1. The MONITOR PANEL also includes three electromechanical counters EMC1, EMC2, EMC3 which respectively indicate the total number of test calls placed by the ACG, the total number of calls which went uncompleted, and the number of uncompleted preselected test calls. These counters are advanced by signals received from the MONITOR PANEL CONTROL (FIG. 9) over leads PC1, PC2 and PC3.

The MONITOR PANEL also includes a thumbwheel switch SW5 with output leads PS1–PS8 for supplying BCD signals to the MONITOR PANEL CONTROL (FIG. 9) corresponding to a selected program number to be run in the manual mode of operation. Push button switch SW6, when depressed, supplies ground on lead $\overline{SW0}$ to by-pass the wait time between programs. A light emitting diode display LED-1 displays the digits dialed, as they are dialed, under the control of the leads MT1–MT8 and PUR1 from the PROGRAM CONTROL (FIG. 3A). Leads MT1–MT8 supply BCD signals for each digit, while lead PUR1 supplies the necessary blanking pulse between digits.

Also shown in FIG. 10 are respective DISPLAY, MONITOR SELECT, PROGRAM SELECT, and ON/-OFF RESET switches SW1–SW4 which supply appropriate system operation signals, to be discussed.

PROGRAM STRAPPING

Another part of the external control of the ACG is carried out by the use of the PROGRAM STRAPPING PANELS shown in FIGS. 6A and 6B. Each dot in the figures represents a terminal pin connector to which strapping leads are connected, to establish which of the dedicated originating and terminating ports are to be used for a particular program. For the sixteen programs available for testing the common control there are respective sets of ten pin terminals 1–0 for numerically identifying each of the seven digits A–G of a directory number to be dialed. For example, if the call for program number one is to be placed to the directory number 123–4567, then in the 0 column (for the first program) one would strap A-1, B-2, C-3, D-4, E-5, F-6, G-7. If a program is to be skipped, the PGO (PROGRAM ORIGINATE) pin terminal for that program number is strapped to its adjacent S (SKIP) pin terminal. For identifying which of the ports, dedicated in the office for use of the ACG, is to be used for an originating call, one of the H pin terminals H1–H14 is strapped to the originating program number terminal pin PGO. On the panel shown in FIG. 6A fourteen port terminal pins H1–H14 are shown. While the number of terminal pins for each set of pin terminals on the panel need not be necessarily limited to those shown, the fourteen originating ports in accordance with the invention encompasses 14 dedicated lines and/or incoming trunks.

The LT leads correspond to the 14 ports, through which the ACG has access to the system under test. The LT lead for a particular port should be strapped to the PGT lead corresponding to the program which is using the port for termination.

Figure 7:
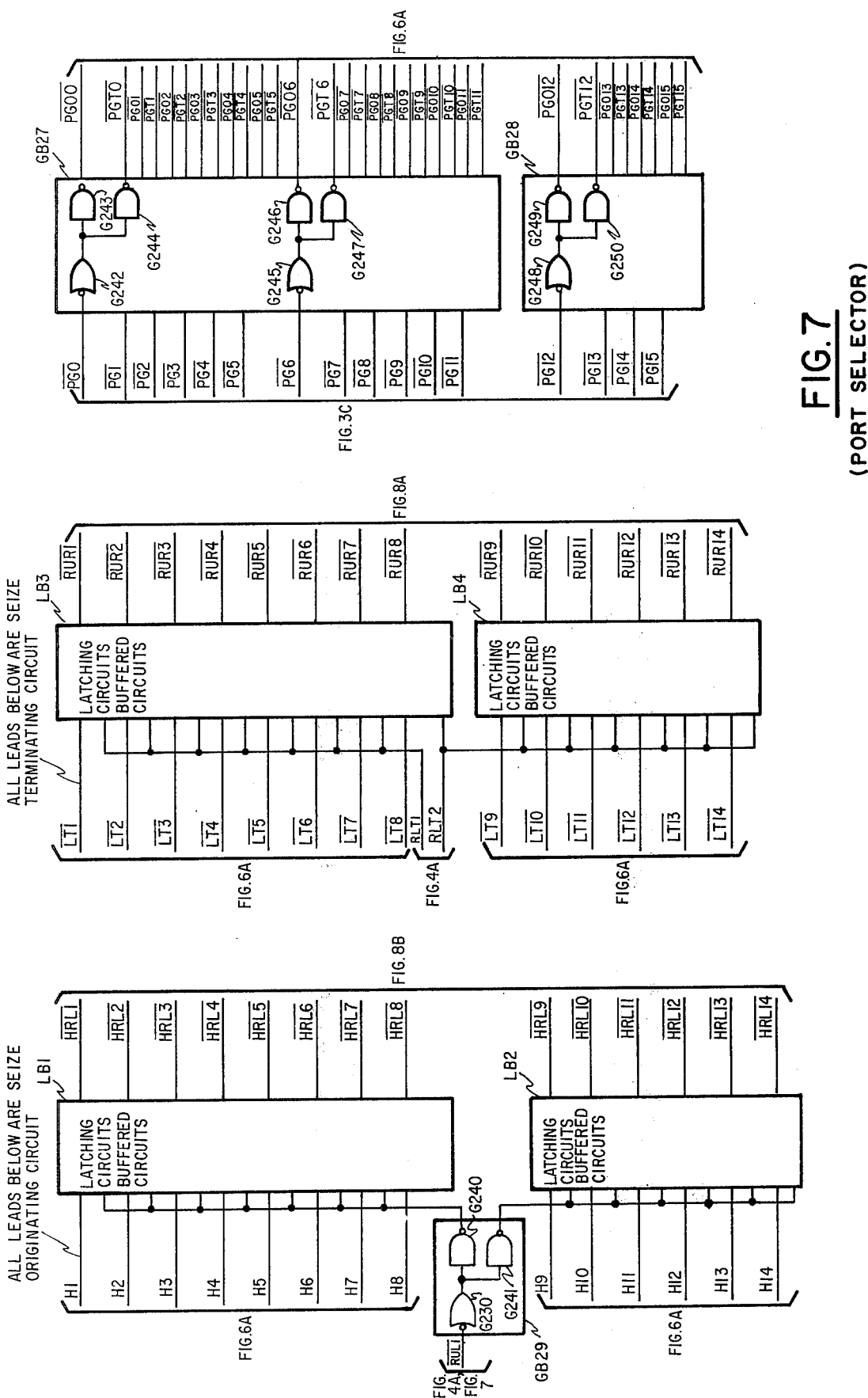
FIG. 7 shows, in detail, the circuitry employed in the port (line/trunk) selector portion of the system block diagram of FIG. 1.

The PGO and PGT leads on the STRAPPING PANEL (FIG. 6A) are also connected to the $\overline{PGOO}$ and $\overline{PGTO}$– $\overline{PGO15}$ and $\overline{PGT\ 15}$ leads of gate buffer circuits GB27 and GB28 in the PORT SELECTOR (FIG. 7). The inputs of the buffer circuits GB27 and GB28 are connected via leads PGO–PG15 to decoder D2 in the PROGRAM CONTROL (FIG. 3C), which provides output signals in the respective leads $\overline{PGO}$–$\overline{PG15}$ as the ACG steps from one program to another.

The STRAPPING PANEL shown in FIG. 6B contains pin terminals for indicating loop-or ground-start operation for each of the fourteen test ports. The TT1–TT14 and TR1–TR14 leads are to be connected through the contacts of the off-hook relays in the LINE/TRUNK ACCESS in FIG. 8C to the tip and ring leads of the fourteen lines and/or trunks used for the test calls. For each trunk, the associated TT and TR terminals must be strapped to a set of either LST and LSR (loop-start tip and ring) or GST and GSR (ground-start tip and ring) terminals.

The dedication of the tip and ring leads and the pair of selected sleeve lead terminals for the pair of outgoing trunks is effected on the MAIN DISTRIBUTION FRAME (MDF). This is achieved by connecting the T1, R1 . . . T14, R14 leads and the S1 and S2 leads shown in FIGS. 8A and 8C to the corresponding terminal connections on the MDF.

The foregoing description relates to the external control, monitoring and physical connections which are available and are selectively employed in connecting the ACG to the telephone system to be tested and monitoring the ability of the common control equipment to complete selected calls, through the office. Due to the dedication of a limited number of line and trunk circuits on the MDF to the ACG, the operation of the ACG will not interfere with the normal operation of the equipment being monitored. The ACG merely acts like calling and called subscribers and monitors whether the common control is capable of connecting the simulated calling subscriber to a call number dialed by the ACG, with the ACG also simulating the called number so that it knows whether it has been able to call itself.

In order to facilitate an understanding of the interconnection and operation of the logic circuitry shown in detail in FIGS. 2–13, the following description will proceed through the various figures in accordance with the operations which are carried out by the system in monitoring the common control, namely, in the placing of a call, stepping through the programs, and performing a self test. Moreover, since the ACG is especially used for automatically monitoring the common control equipment, the description will begin with the automatic mode of operation.

AUTOMATIC MODE

CALL SELECTION AND DIALING

Figure 3C:
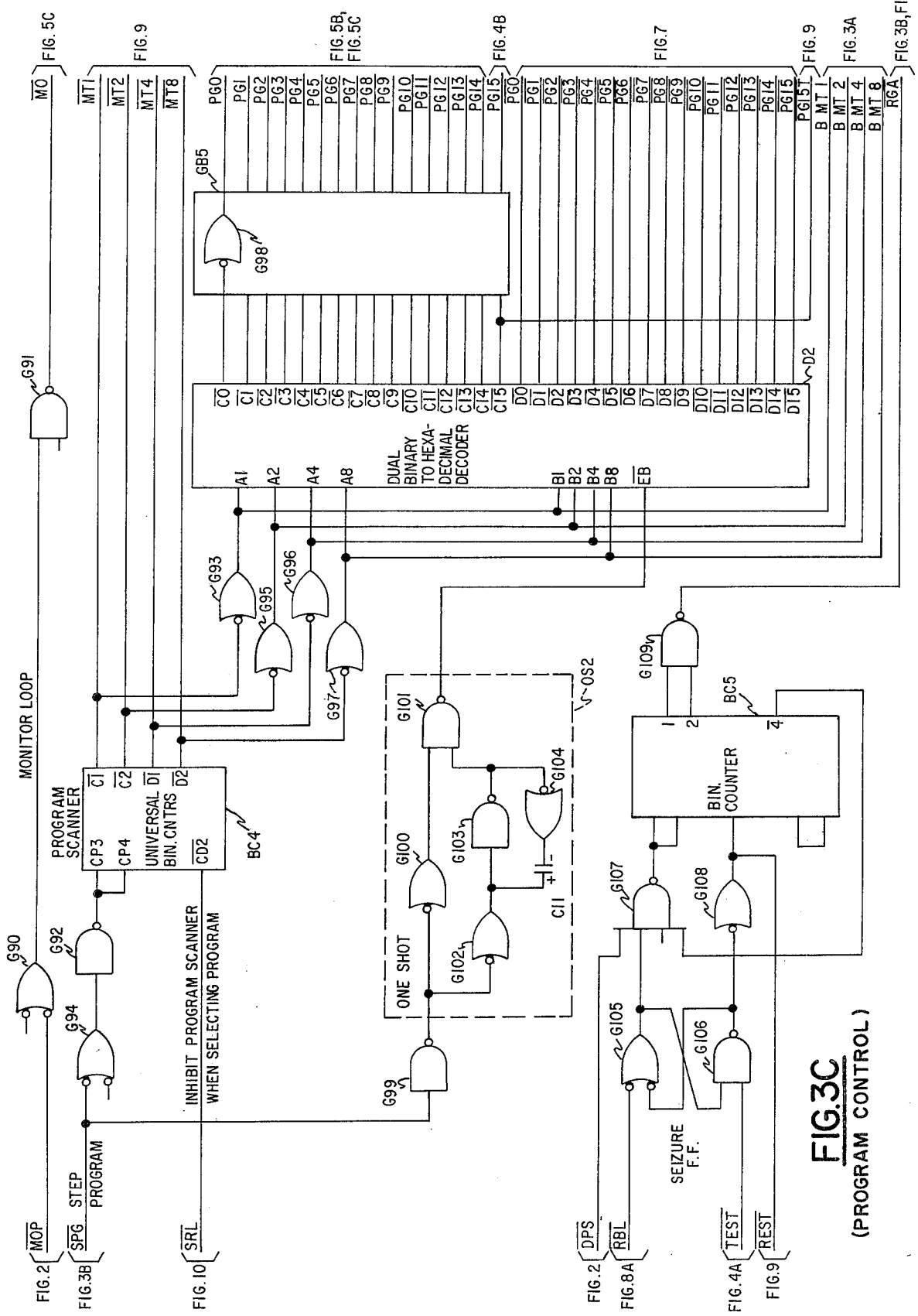
Figure 9:
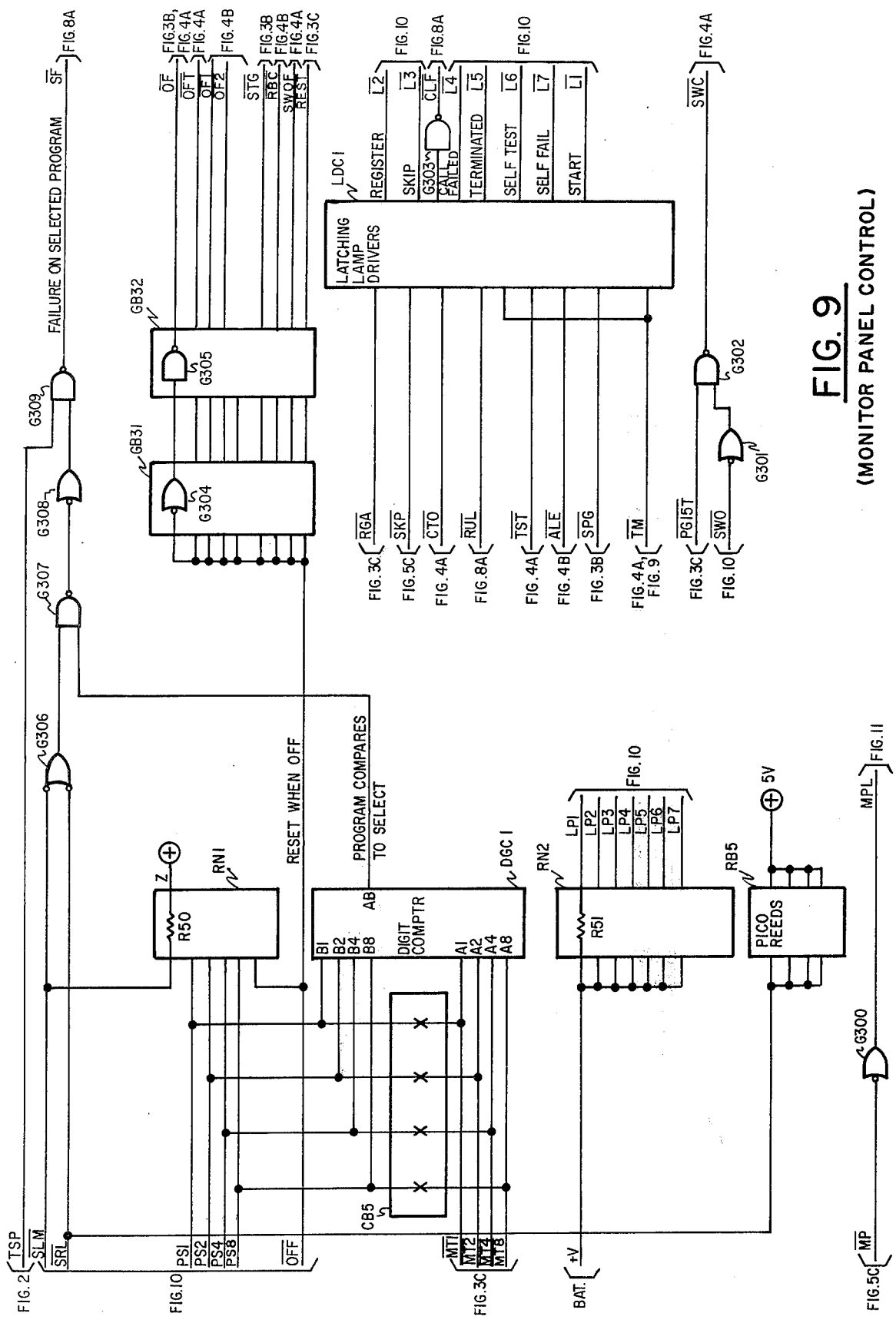
FIG. 9 illustrates the circuitry details of the monitor panel control portion of the system block diagram of FIG. 1.

Initially, when the system is activated, ON/OFF (RESET) switch SW4 (FIG. 10) is in the OFF (RESET) position. This provides a ground level on lead $\overline{OFF}$, which is supplied to gate buffer circuits GB31 and GB32 in the MONITOR PANEL CONTROL (FIG. 9) to supply appropriate reset levels to the various inputs of the TEST CONTROL (FIGS. 4A–4B) and PROGRAM CONTROL (FIGS. 3A–3C). The $\overline{OF}$ lead is supplied to gate G40 in the PROGRAM CONTROL to reset the START F.F. and the 600 MS F.F. The $\overline{OF}$ lead also resets the ALARM F.F. in the TEST CONTROL (FIGS. 4A). The $\overline{OFT}$ lead resets the TEST F.F. in the TEST CONTROL (FIG. 4A). The $\overline{OF1}$ lead resets the T1 F.F. while the $\overline{OF2}$ lead resets the RUN F.F. in the TEST CONTROL (FIG. 4B). The $\overline{STG}$ lead sets the WAIT F.F. in the PROGRAM CONTROL (FIG. 3B), while the $\overline{RBC}$ lead resets the counter BC8 in the TEST CONTROL (FIG. 4B). The SWOF lead is coupled to the gate G120 in the TEST CONTROL (FIG. 4A) to provide reset signals on leads $\overline{RUL\ 1}$, RLT1 and RLT2 to the PORT SELECTOR (FIG. 7) and on lead $\overline{TM}$ to the latching lamp driver LDC-1 in the MONITOR PANEL CONTROL (FIG. 9). The $\overline{REST}$ lead resets counter BC-5 in the PROGRAM CONTROL (FIG. 3C). The MONITOR SELECT and PROGRAM SELECT SWITCHES SW2 and SW3, respectively, are turned OFF and, if a display is desired, the DISPLAY switch SW1 is turned ON. With the ACG being reset, and ready for operation, the ON/OFF RESET switch SW4 is now turned ON.

With the ON/OFF switch SW4 switched to the ON position, the reset level on the lead $\overline{OF}$ from gate buffer GB-32 in FIG. 9 is removed from the input to gate G40 in The PROGRAM CONTROL (FIG. 3B). As a result, via gates G41, G75, G78 and G82, reset is removed from lead SMT, which is coupled through gate G6 in the DIALING CONTROL (FIG. 2) to the reset input $\overline{CD1}$ of one of the pair of binary counters in the digit scanner BC-2. This digit scanner BC-2 comprises a pair of universal binary counters which count dial pulses supplied from gate G5 to inputs CP1 and CP2 and provide BCD outputs over leads BDP1–BDP8, and at outputs $\overline{A1}$, $\overline{A2}$, $\overline{B1}$, $\overline{B2}$ and $\overline{C1}$, $\overline{C2}$, $\overline{D1}$, $\overline{D2}$. The latter pair of sets of BCD outputs are applied to a dual binary to hexa-decimal decoder D1 which converts the BCD inputs on pairs of line sets A1–A8 and B1–B8 to decimal outputs. The combination of the digit scanner BC-2 and decoder D1 is for the purpose of counting the pulses of the respectively dialed digits and advancing the count from pulse to pulse and digit to digit until all seven dialed digits have been transmitted. Each dialed digit is created by a series of pulses produced at a 10 pps rate by clock CL-1, which supplies pulses through gates G14, G12, G10, G9 and G5 to the pulse inputs CP1 and CP2 of the digit scanner BC-2.

Figure 8C:
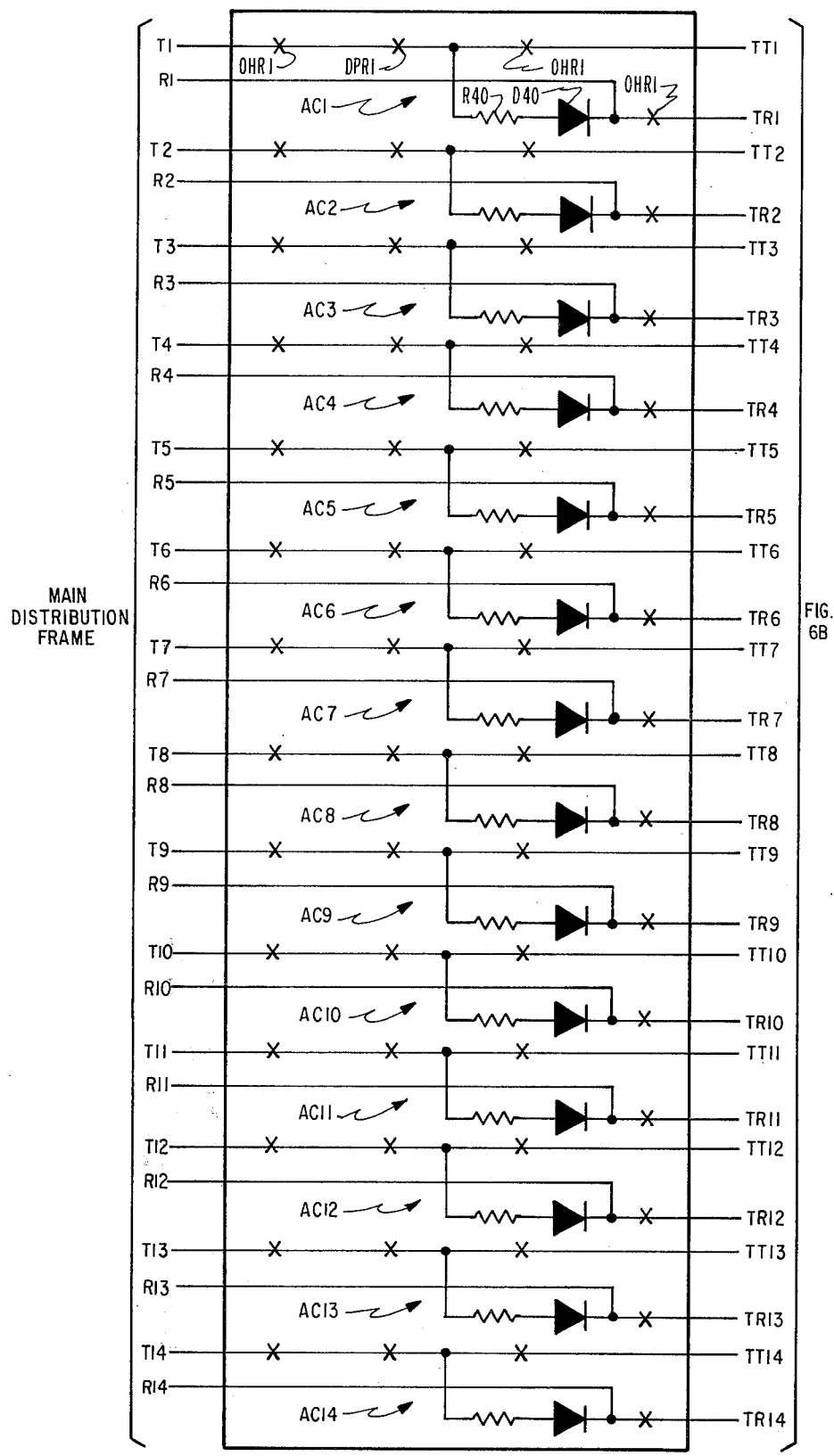

The output of gate G5 is also supplied over lead DPL to the dial pulse relays in the LINE/TRUNK ACCESS (FIG. 8B). The dial pulses are buffered through gate buffer circuit GB30 to each of the dial pulse relays, such as relay DPR1 shown in block DP1. An additional thirteen relays are contained in the dial pulse relay circuits DP1–DP4. The corresponding contacts of these relays, such as DPR1, are disposed in the access circuits AC1–AC14 shown in FIG. 8C. The 14 respective sets of tip TT1-TT14 and ring TR1-TR14 leads are connected to the corresponding TT1–TT14 and TR1–TR14 terminal pins in the PROGRAM STRAPPING FIELD (FIG. 6B). The T1, R1–T14, R14 leads of the respective access circuits AC1–AC14 are connected to the fourteen dedicated ports on the MAIN DISTRIBUTION FRAME.

Similarly, 14 sets of OFF-HOOK relays such as OHR1 in the off-hook relay circuits OH1–OH4, in the LINE/TRUNK ACCESS (FIG. 8B), receive input signals over leads $\overline{HRL1}$–$\overline{HRL14}$ via amplifier buffer circuits AB2–AB3. The $\overline{HRL1}$–$\overline{HRL14}$ leads are connected to a corresponding set of LATCHING BUFFER CIRCUITS LB1–LB2 in the PORT SELECTOR (FIG. 7). Inputs to these LATCHING BUFFER CIRCUITS LB1–LB2 are connected to the originating port pin terminals H1–H14 in the PROGRAM STRAPPING PANEL (FIG. 6A). Since the originating pin terminals H1–H14 are strapped to the various program pin terminals in the PGO field, as the system steps through each program, the level on the H lead for that program will cause the energization of the corresponding OFF-HOOK relay OHR1, OHR2, . . . OHR14 in the LINE/TRUNK ACCESS (FIG. 8B).

Upon the closure of the OFF HOOK relay contacts, such as OHR1, in the appropriate access circuit AC-1–AC14 which is connected via the T and R leads to the dedicated terminals on the MAIN DISTRIBUTION FRAME, the opening and closing of the dial pulse contacts, such as contacts DPR1 send dial pulsing signals to the dedicated TIP and RING leads for that port.

Figure 2:
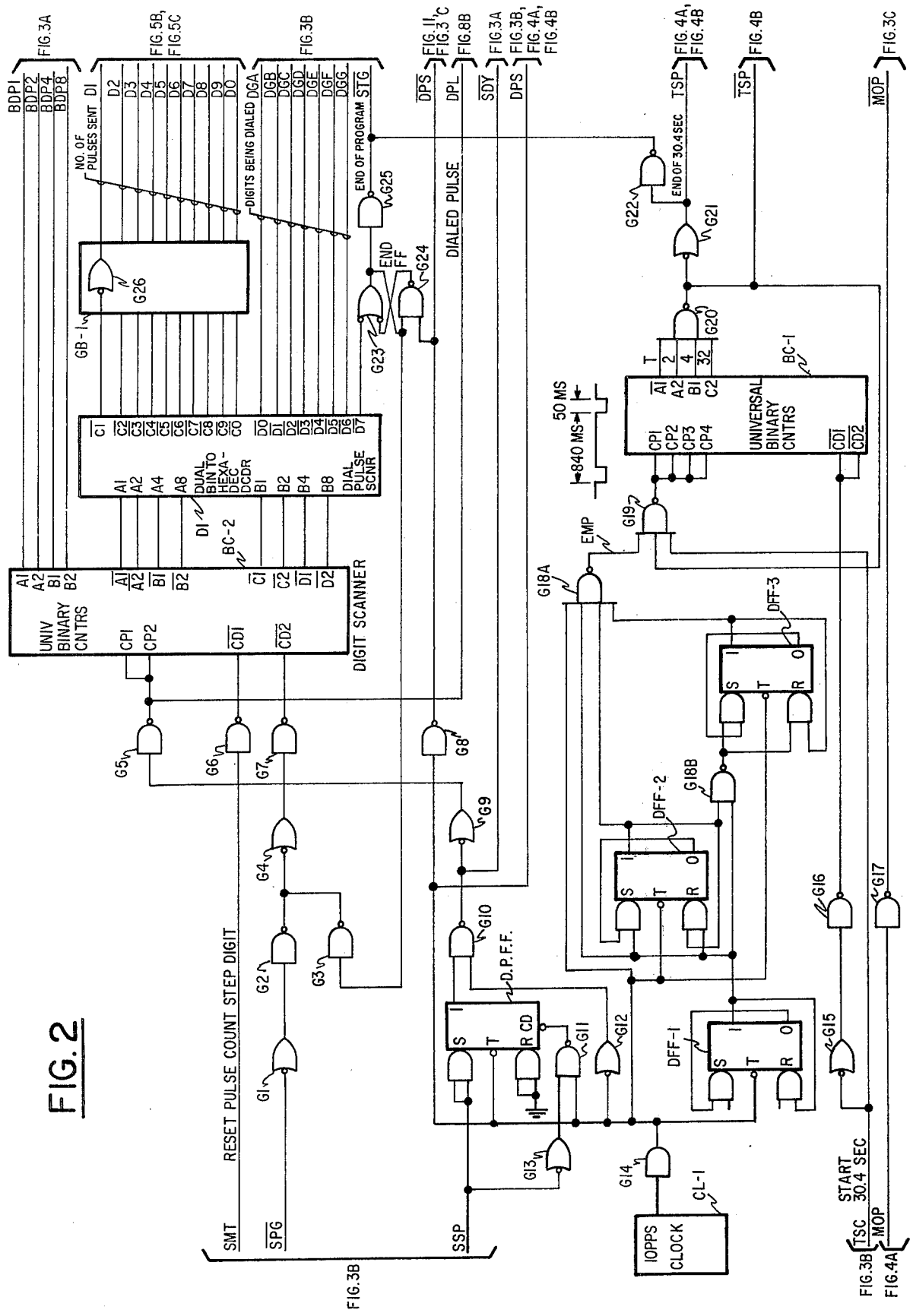
FIG. 2 illustrates the detailed circuitry connections of the dialing control portion of the system block diagram of FIG. 1.

Another input of gate G10 (FIG. 2) is connected to the set output of digit pulse flip-flop DPFF, which is set by an SSP signal from the PROGRAM CONTROL (FIG. 3B). The SSP signal is initially provided from gate G77 shown in FIG. 3B. Gate G77 is coupled through G74 and gate G49 to the START F.F. and through gates G74, G47 –G46, G48 –G45 to gate buffer circuit GB4. The inputs $\overline{A-G}$, DGA–DGG to gate buffer circuit GB4, at the beginning of a program, indicating that no complete digits have been dialed, so that with the START F.F. set, an SSP signal is supplied to the digit pulse flip-flop D.P.F.F. in the DIALING CONTROL (FIG. 2).

The START F.F. which, like other logic circuit components, was initially reset by the signal on lead $\overline{OF}$, through gates G40 and G41, is set by a signal in lead $\overline{RGA}$. This signal is generated at the output of gate G109 connected to binary counter BC5 in the PROGRAM CONTROL (FIG. 3C). Counter BC5 is employed as an off-hook detector counter and enables gate G109 upon counting 3 pulses from the clock CL-1 over line $\overline{DPS}$, after a register has been seized. Seizure indication is provided on the LP2 lamp on the MONITOR PANEL (FIG. 10) via the L2 lead from the MONITOR PANEL CONTROL (FIG. 9).

For register seizure, one of the GST or LSR, LST leads is connected from the STRAPPING PANEL (FIG. 6B) to the OPTO-ISOLATORS OI-2 in the LINE/TRUNK ACCESS (FIG. 8A). The details of the OPTO-ISOLATORS OI-1 and OI-2, shown in block diagram form in FIG. 8A, are illustrated in FIG. 13.

As is shown in FIG. 13, an OPTO-ISOLATOR includes an optical coupler circuit OC-1 having a light emitting diode D81 and a light responsive transistor T80. In response to a potential across the input leads, through resistor R80 and reverse-biased diode D80, transistor T80 turns on, to provide the $\overline{RBL}$ output, corresponding to a register seizure. For ground-start operation, activation of the $\overline{RBL}$ lead, supplies via gate G57 and amplifier buffer AB1 (FIG. 8A) a signal on the ground start ring lead GSR.

The RBL signal also sets the SEIZURE F.F. in the PROGRAM CONTROL (FIG. 3C) which enables gate 107 to pass the $\overline{DPS}$ pulses to the counter BC5. After counting 3 pulses, counter BC5 enables gate G109, to supply the RGA signal to set the START F.F. in the PROGRAM CONTROL (FIG. 3B). This three pulse delay period gives the register sufficient time to be ready to receive pulses. With the START F.F. now set by RGA, gates G74 and G77 supply the SSP signal to enable digit pulse counting to commence.

As each complete digit is received, gate buffer circuit GB4 (FIG. 3B) will cause one of the gates G47, G48 to supply a "STOP PULSING" signal to gate G74, and thereby reset the D.P.F.F. by way of gates G13, G11 in the DIALING CONTROL (FIG. 2). Note that gate G11 is connected to the 10pps generator clock CL-1 through gate G14 to synchronize the operation with the transient edges of the 10pps clock signal.

In order to determine whether a complete digit has been received, gate buffer circuit GB4 (FIG. 3B) has inputs $\overline{A}$–$\overline{G}$ connected to the PROGRAM SELECTOR (FIG. 5A) and inputs DGA–DGG connected to the decoder D1 in the DIALING CONTROL (FIG. 2). The PROGRAM SELECTOR includes sets of gate buffer circuits GB6, GB7, GB8 and GB9 which buffer the seven digits of each of the sixteen programs as strapped on the STRAPPING PANEL (FIG. 6A) to leads $\overline{A}$–$\overline{G}$. The input leads A0, A1, A2 . . . G13, G14, G15 are connected to the corresponding terminal pins on the PROGRAM STRAPPING PANEL (FIG. 6A). Since, as was described above, each digit pin terminal A, B, C, D, E, F and G is strapped to the pin terminal corresponding to its numerical identification in the directory number in the digit-to-be-dialed field of the PROGRAM PANEL, when the pin terminal in the digit-to-be-dialed field, to which the digit pin terminal A-G is connected, receives a digit pulse signal, then the digit output lead $\overline{A}, \overline{B}, \overline{C}$, . . . for that digit signals the gate buffer GB4 in the PROGRAM CONTROL (FIG. 3B) to forward an SSP signal to the DIALING CONTROL (FIG. 2) to prevent digit scanner BC-2 from receiving further pulses to be counted. The DGA–DGG leads from the DIALING CONTROL identify which of the seven digits A–G is presently being dialed. Activation of these respective leads is sequentially stopped by the decoder D1 in the PROGRAM CONTROL (FIG. 2).

The resetting of the digit scanner BC2 (FIG. 2) for each digit is effected by a signal over the SMT lead through gate G6 to the reset input $\overline{CD1}$. The SMT signal is generated at the end of a prescribed "interdigit time", namely, a short period of time between each dialed digit. This period has been selected to be 600 ms and is determined by counting seven pulses from the clock CL-1 beginning with the end of each digit. For this purpose, binary counter BC3 in the PROGRAM CONTROL (FIG. 3B) is connected via gate G76 to receive pulses over lead DPS from the dial pulse clock CL-1 in the DIALING CONTROL (FIG. 2) and an enabling signal from gate buffer circuit GB4 through gate G73. Gate 79 is enabled at the end of 600 ms to set the 600 MS F.F. via gate G80 and G81 and provide the SMT signal. The next dial pulse over line DPS will reset the counter BC3 at its reset input CD1 from gate G83 in the 600 MS F.F.

The pin terminals for each respective program in the digit-to-be-dialed filed of the STRAPPING PANEL (FIG. 6A) are connected to the respective outputs $\overline{1PO}$ — $\overline{OPO}$ . . . $\overline{1P15}$ — $\overline{OP15}$ of the sixteen respective gate buffer circuits GB10-GB25 in the PROGRAM SELECTOR (FIGS. 5B and 5C) one of the inputs to the gates of which are provided from the leads D1-D0 from the gate buffer circuit GB1 in the DIALING CONTROL (FIG. 2). The other input of each enabling gate in the respective gate buffer circuits GB10-GB25 is connected to the respective outputs PG0-PG15 of gate buffer circuit GB5 in the PROGRAM CONTROL (FIG. 3C). These outputs identify which particular one of the sixteen available programs is being run. For this purpose, the PROGRAM CONTROL (FIG. 3C) includes a program scanner BC-4, which comprises universal binary counters, and a dual binary to hexadecimal decoder D2 connected to the BCD outputs of the program scanner BC4 through gates G93, G95, G96 and G97 in a mannner similar to the arrangement of digit scanner BC2 and decoder D1 in the DIALING CONTROL (FIG. 2). The program scanner BC4 counts program step signals over line $\overline{SPG}$ applied through gates G94 and G92. The $\overline{SPG}$ step program signal is provided at the output of one shot delay circuit OS1 in the PROGRAM CONTROL (FIG. 3B). The one-shot delay circuit OS1 includes gates G63-G67 with capacitor C10 provided in the feedback loop for gate G65. This delay circuit is activated by gate G62 in response to the input on lead $\overline{OF}$, referred to above, when the ACG is reset, and from gate G58 when the WAIT F.F. is set to advance the operation of the system to the next program.

The step program signal on lead $\overline{SPG}$ is supplied to gate G1 in the DIALING CONTROL (FIG. 2) to reset the digit scanner BC-2 through gates G2, G4 and G7. It also energizes the START lamp on the MONITOR PANEL via the $\overline{LI}$ lead from the lamp driver LDC-1 in the MONITOR PANEL CONTROL (FIG. 9). The digit scanner is also reset by gate G3 when the END F.F. is set by the $\overline{D7}$ output of decoder D1 at the end of the dialing of all the digits for each respective program.

The $\overline{SPG}$ lead is also coupled via gate G99 to another one-shot delay circuit OS2, made up of gates G100-G104 and capacitor C11, to reset the decoder D2. The $\overline{MT1}-\overline{MT8}$ outputs of the counter BC-4 are supplied to the comparator DGC1 in the MONITOR PANEL CONTROL (FIG. 9).

The WAIT F.F. provides an indication that the system is operating in the wait period between programs. At the end of each program, namely, after the last or seventh digit has been dialed, decoder D1 in the DIALING CONTROL (FIG. 2) provides a signal at output $\overline{D7}$ which sets the END F.F. indicating the end of the program dialing, and the output of gate G25 on lead $\overline{STG}$ sets the WAIT F.F. in the PROGRAM CONTROL (FIG. 3B). When the wait time in between programs expires, the WAIT F.F. is reset, which will cause the oneshot delay circuit OS1 to be triggered through gates G58 and G62, to set the TIME F.F. for the next program. The TIME F.F. provides an indication that the 30 second period permit for the call to be terminated in the program is being timed.

Thus, referring back to the portion of the PROGRAM CONTROL shown in FIG. 3C, for each step program signal on lead $\overline{SPG}$ the program scanner BC4 will advance a count and the output from the gate buffer circuit GB5 will correspondingly advance from PG0 – PG1– PG2, etc.

The above description relates to the manner in which dial pulses are generated and counted, and how complete digits are recognized and the totality of the seven digits used is effected.

DIALED DIGIT DISPLAY

As the dial pulses are counted and as the digits are advanced, the digit scanner BC2 in the DIALING CONTROL (FIG. 2) supplies BCD outputs over leads BDP1, BDP2, BDP4, BDP8 to respective gates of the gate buffer circuit GB2 in the PROGRAM CONTROL (FIG. 3A). These gates are enabled by the DIGIT F.F. which is set by the $\overline{SDY}$ lead from gate G10 in the DIALING CONTROL (FIG. 2). Respective BCD outputs are supplied through gate buffer circuit GB3 over lines MI1-MT8 to the LED display LED-1 in the MONITOR PANEL (FIG. 10) so that a display of the dialing of the digits will be presented. In a similar manner, LED-1 displays the advance of the program number in response to the gate buffer circuit GB2 in the PROGRAM CONTROL (FIG. 3A) receiving BCD inputs on leads BMT1, BMT2, BMT4, BMT8 from respective gates G93, G95, G96 and G97 as the programs are counted by the program scanner BC4 (FIG. 3C). The BCD lines MT1-MT8 for causing the PROGRAM NUMBER to be displayed are activated when the DIGIT F.F. is reset by lead $\overline{STG}$ from the MONITOR PANEL CONTROL (FIG. 9). Thus, when dialing is taking place, the DIGIT F.F. is set and the dialed digits, as designated by leads BDP1-BDP8, are displayed. Otherwise, the DIGIT F.F. is reset by the $\overline{STG}$ lead and the gates which couple the BCD signals over leads BMT1-BMT8 representative of the program number are supplied to the LED display LED-1. Gate G32 supplies a blanking pulse PUR1 to the LED-1 between digits in response to the SSP and $\overline{SDY}$ leads referred to above.

CALL TERMINATION-TIMING

As was discussed previously, in the process of attempting to make call, the system is designed to permit the call to be terminated within a period of approximately 30 seconds. If the call is not terminated to the called party within this period of time, a call failed count is generated, indicating that the common control has failed to complete a call for that particular program. The timing function for this purpose is carried out by a divider and binary- counter within the DIALING CONTROL (FIG. 2).

Referring to FIG. 2, there are three divider flip-flops DFF-1, DFF-2, DFF-3 and gates G18A, G18B which divide the 10 pps dial pulses into (840 high, 50 ms low) pulses which are supplied to gate G19 to be counted by binary counter BC-1. When enabled, counter BC-1 counts the pulses from the divider until it reaches a count of 38 (30.4 seconds), at which time gate G20 is enabled to reverse the level on leads TSP and $\overline{TSP}$. Gate G22 supplies an end of program signal on lead $\overline{STG}$ since the 30.4 second termination period has expired and gate G19 is disabled by the feedback loop from gate G20 preventing counter BC-1 from counting further pulses.

To start the 30.4 second timing operation, a signal on lead TSC initially resets the counter BC-1 at reset terminals $\overline{CD1}$ and CD2, while enabling gate G19 via gates G15 and G16. The TSC lead receives a start signal from the TIME F.F. in the PROGRAM CONTROL (FIG. 3B) via gates G71 and G72. The TIME F.F. is set by one-shot delay OS1 at the end of each wait period and when the system is turned on as described previously. When the TIME F.F. is set, gate G70 enables lead $\overline{TA}$ which via amplifier A1 in the amplifier buffer circuit AB1 in the LINE/TRUNK ACCESS (FIG. 8A) and the PC1 lead causes the electromechanical counter EMC 1 to be advanced, which displays the number of calls made.

If the counter BC-1 times out the 30.4 second interval, the TSP lead is activated to trigger gate G131 in the TEST CONTROL (FIG. 4A). The other input of gate G131 is enabled by the ON/OFF (RESET) switch SW4 on the MONITOR PANEL which causes the $\overline{OFT}$ lead to be activated by the MONITOR PANEL CONTROL (FIG. 9). When gate G131 is triggered a CALL FAIL signal is applied over lead $\overline{CTO}$ to the latching lamp drivers LDC-1 in the MONITOR PANEL CONTROL (FIG. 9) to supply an output on lead $\overline{L4}$ to the lamp LP4 on the MONITOR PANEL indicating a call fail condition. Call failure signalling will be discussed in greater detail in connection with the description of the TEST CONTROL (FIGS. 4A and 4B) below.

If the call is terminated within the 30.4 second interval allotted by the DIALING CONTROL (FIG. 2) a call termination detected signal will be delivered on lead $\overline{RUL}$ from the LINE/TRUNK ACCESS (FIG. 8A), which signal, via gates G52 and G61 (FIG. 3B) resets the TIME F.F., to reverse the level on lead TSC. As a result, gate G19 in the DIALING CONTROL (FIG. 2) is disabled and the counter BC-1 fails to enable gate G20. Accordingly, the levels on the TSP and $\overline{TSP}$ leads are not reversed so that no failure indication is generated. The $\overline{RUL}$ lead is also connected to lamp driver LDC-1 in the MONITOR PANEL CONTROL (FIG. 9) to light lamp LP5 in the MONITOR PANEL (FIG. 10).

The RING UP DETECT signal on lead $\overline{RUL}$ is supplied by the OPTO ISOLATORS OI-1 in the LINE/TRUNK ACCESS (FIG. 8A). The diode biasing for the opto-detection circuit in each OPTO ISOLATOR is supplied over the TIP and RING leads from the dedicated 14 ports on the MAIN DISTRIBUTION FRAME. The closure of the K contacts in the relay contact circuits CB1A–CB1B, CB2A–CB2B, CB3A–CB3B, CB4A–CB4B, in response to the energization of the pairs of picoreed K relays in the respective relay circuits RB1, RB2, RB3, RB4, provides connection for the OPTO-ISOLATORS OI-1 so that the $\overline{RUL}$ signal is generated to signal the PROGRAM CONTROL (FIG. 3B) that the call has been terminated. When the call terminates at one of the two dedicated outgoing trunks, the RING UP DETECT signal is generated on lead $\overline{RUL}$ by the closure of one of the contacts in relay contact circuit CB4. The $\overline{RUL}$ lead also activates the $\overline{RUL1}$ lead, via gates G52 and G61, to reset the LATCHING BUFFER CIRCUITS LB-1, LB-2 in the PORT SELECTOR (FIG. 7).

As was described previously, a call may be terminated at any one of the dedicated line circuit ports or at one of the two dedicated outgoing trunk circuits. The line circuits leads $\overline{RUR1}$–$\overline{RUR14}$ are connected between the relay circuits RB1, RB2, RB3 and the corresponding outputs of the LATCHING BUFFER CIRCUITS LB3, LB4 in the PORT SELECTOR (FIG. 7). Input leads $\overline{LT1}$–$\overline{LT14}$ of LB3 and LB4 are connected to the line circuit terminating pin terminals in the LT field of the STRAPPING PANEL (FIG. 6A). Thus, via the strapping between the PGT field and the LT field on the STRAPPING PANEL (FIG. 6A) the system is informed where the call for each program is to terminate.

Upon termination of the call, the RING UP DETECT signal $\overline{RUL}$, from either the OPTO-ISOLATOR OI-1 for a call terminating at a dedicated line circuit, or from the closure of the K1 and K2 contacts in the relay contact circuit CB4 when the call terminates at one of the two dedicated outgoing trunks, is supplied to gate G52 in the PROGRAM CONTROL (FIG. 3B). This signal is then coupled through gate G61 to reset the TIME F.F. as explained above and to reset the LATCHING BUFFER CIRCUITS LB1, LB2 in the PORT SELECTOR (FIG. 7) to release the originating circuit.

INTER-PROGRAM TIMING (WAIT TIME)

As has been described previously, there is an established period of time between programs, referred to as "wait time". At the end of each period of "wait time," a new program is begun. In order to monitor the wait period between programs, circuitry within the PROGRAM CONTROL (FIG. 3B) and TEST CONTROL (FIG. 4A) is employed. As was described above in connection with the operation of the DIALING CONTROL (FIG. 2) at the end of a program, the END F.F. is set and a signal appears on lead $\overline{STG}$. This signal is supplied to the WAIT F.F. in the PROGRAM CONTROL (FIG. 3B) which is set by the $\overline{STG}$ lead.

When the WAIT F.F. is set, a signal is coupled through gate G59 on the $\overline{TMC}$ lead to gate G110 in the TEST CONTROL (FIG. 4A). This $\overline{TMC}$ signal resets the wait time binary counters BC6 and counter BC7 via gates G114 and G116. It also enables gate G115 to pass dial pulses from lead DPS through gate G112 to be counted by the wait time counters. When the count of DPS pulses corresponds to a period of 1.7 minutes, gate G119 at the output of counter BC7 is enabled, to supply a signal through gates G126-G125 over lead $\overline{TMP}$ indicating the termination of the "wait time". The $\overline{TMP}$ lead is coupled to the WAIT F.F. in the PROGRAM CONTROL (FIG. 3B) so that the WAIT F.F. becomes reset. When the WAIT F.F. is reset, one shot OS1 is triggered and a signal appears on lead $\overline{SPG}$ to start the next program. The $\overline{ST0}$ lead is also activated which enables one of the inputs to gate G130 in the TEST CONTROL (FIG. 4A) so that the TSP lead, when activated, will trigger gate G130 to set the ALARM F.F. The ALARM F.F. relates to a call failure condition, and will be discussed in the description of the TEST CONTROL below.

SELF TEST

In addition to establishing the wait time, the TEST CONTROL (FIGS. 4A and 4B) also carries out the ACG self test at the termination of the sixteenth or last program. This self test is effectively used to be certain that the wait time (1.7 minutes) and the call termination time (30.4 seconds) are being correctly timed by the ACG.

Test 1

To this end, when decoder D2 in the PROGRAM CONTROL (FIG. 3C) enables the PG15 lead via gate buffer GB5 for the sixteenth program, one of the inputs to gate G152 in the TEST CONTROL (FIG. 4B) is enabled. The other input, via gate G150, is enabled by the $\overline{TEST}$ lead from one of the BCD outputs of counter BC7 (FIG. 4A) which is timing the wait time period. When this occurs, the T1 F.F. in the TEST CONTROL (FIG. 4B) is set, to activate the $\overline{MCT}$ lead via gates G155 and G164. The $\overline{MCT}$ lead sets the TEST F.F. (FIG. 4A) and starts the wait time counters BC6, BC7 via gates G110, G114, G116, G115. At the same time, control of the wait time counters BC6, BC7, by the WAIT F.F. is removed by change in level on the $\overline{TST}$ lead, which disables gate G59 in the PROGRAM CONTROL (FIG. 3B) to deactivate the $\overline{TMC}$ lead input to gate G110 in the TEST CONTROL (FIG. 4 A). Namely, control is now via the $\overline{MCT}$ lead. The $\overline{MCT}$ lead sets the TEST F.F. to activate the TST lead via lamp driver LDC-1 in the MONITOR PANEL CONTROL (FIG. 9). The MONITOR PANEL SELF TEST lamp is energized.

The setting of the T1 F.F. also enables the possibility of a self-test failure on one of the leads to gate G166 and enables the $\overline{TSC}$ lead via gates G155 and G167. The $\overline{TSC}$ lead is inverted by gate G72 in the PROGRAM CONTROL (FIG. 3B) and is coupled to gates G15 and G19 in the DIALING CONTROL (FIG. 2) to start the 30.4 second counter BC-1. Now, if the 30.4 second counter finishes before the 1.7 minute wait time counters, as it should during proper operation, the TSP lead output from the 30.4 second counter BC-1 in the DIALING CONTROL (FIG. 2) will reset the T1- F.F. and remove the self-test fail enable input to gate G166. However, should the wait time counters finish the 1.7 minute time out first, then the $\overline{TMPT}$ lead from gate G119 in the TEST CONTROL (FIG. 4A) will enable the other input to gate G166, via gate G159, and thereby activate the SELF TEST ALARM lead $\overline{ALE}$ (FIG. 4B). The $\overline{ALE}$ lead is connected to the LATCHING LAMP DRIVERS LDC1 in the MONITOR PANEL CONTROL (FIG. 9) and a SELF FAIL indication on lead $\overline{L7}$ is supplied to the SELF FAIL (RED) lamp LP7 on the MONITOR PANEL (FIG. 10). The $\overline{ALE}$ lead also sets the ALARM F.F. in the TEST CONTROL (FIG. 4 A) via gates G135 and G134. The MOP lead from gate 127 at the output of the ALARM F.F. is coupled through gate G17 in the DIALING CONTROL (FIG. 2) gate G90 and G91 in the PROGRAM CONTROL (FIG. 3C), gate G228 and G229 in the PROGRAM CONTROL (FIG. 5C) gate G300 in the MONITOR PANEL CONTROL (FIG. 9) to the MONITOR AND ALARM circuit MA1 via lead MPL (FIG. 11).

Normally, when the ALARM F.F. (FIG. 4A) is reset, gate 127 is enabled and a 940 Hz clock signal from clock CL2 can pass through gate 127, and the series of gates G17, G90, G91, G228, G229 and G300 to the MONITOR AND ALARM CIRCUIT MA1, the details of which are shown in FIG. 12.

MONITOR AND ALARM

Referring to FIG. 12, the MONITOR AND ALARM circuit comprises a first PNP transistor Q1, the base of which is coupled to pin P and the MPL lead via resistor R7. Resistor R1 provides base bias from a suitable source of potential +V. The emitter of transistor Q1 is also connected to the +V source, while the collector is biased through resistor R2 to ground. Transistor Q1 is coupled to the base of NPN transistor Q3 by way of capacitor C1, resistor R5 and diode CR1, so that transistor Q3 will be controlled by an edge of the input signal, Resistor R8 connects the emitter of transistor Q3 to negative bias while collector bias is supplied by resistors R6 and R3 to ground. The collector of transistor Q3 is also connected to capacitor C2. The base of a third transistor Q2 is connected to a Zener diode CR8 and to base bias resistor R10. The emitter of transistor Q2 is grounded and the collector is coupled through resistor R9 to a normally operated alarm relay ALM. The contacts of relay ALM are provided in the lamp circuit between ground and negative battery via diodes CR6 and CR7 and resistor R4. Diode CR5 supplies ground over lead EM at pin S to the CABINET SUPERVISORY of the system when the alarm relay ALM drops out.

The operation of the MONITOR AND ALARM circuit MA1 is as follows. During normal operation of the ACG, gate G127 in the TEST CONTROL (FIG. 4A) is enabled, to permit the 940 Hz clock signal from CL2 to be delivered to the MPL lead and pin P to the base of transistor Q1. This pulse signal is rectified by diode CR3 and stored in capacitor C2 by the switching action of transistor Q3. As long as the 940 Hz clock signal continues to be delivered, capacitor C2 is sufficiently repetitively recharged via transistor Q3 to prevent Zener diode CR8 from turning off transistor Q2. However, in response to an alarm condition, namely, the ALARM F.F. being set, pulses from the 940 Hz clock are no longer supplied to the MONITOR AND ALARM circuit MA1. As a result, capacitor C2 discharges sufficiently through resistors R3 and R6, the potential across Zener diode CR8 is insufficient to maintain conduction of transistor Q2, and transistor Q2 turns off. This causes the alarm relay ALM to drop out and a current path is created between ground, the closed contacts (2) of relay ALM diode CR6, lamp LP1, resistor R4 and negative battery to energize lamp LP1. Ground is also supplied via diode CR5 to pin S over the EM lead to signal the CABINET SUPERVISORY. At the same time, contacts (1) of relay ALM open, to deenergize lamp LP2.

In a similar manner, MONITOR AND ALARM circuit MA2 also provides an alarm signal when clock CL-1 fails to provide dial pulses through gate G8 over lead $\overline{DPS}$ from the DIALING CONTROL (FIG. 2). The time constants of the RC charging and discharging circuits for the respective MONITOR AND ALARM circuits MA1 and MA2 are such that the capacitors C2 therein are repetitively recharged to maintain energization of the ALM relays as long as MPL and $\overline{DPS}$ clock pulses are supplied.

Test 2

Referring again to the TEST CONTROL (FIG. 4B) when the first self test (test 1) has finished, the T1 F.F. has been reset by the input on lead TSP from the 30.4 second timer in the DIALING CONTROL (FIG. 2). The output of gate G154 in the T1 F.F. enables gate G151, to set the T2 F.F. for carrying out the second self test. When the T2 F.F. is set, an enabling level is supplied to gates G160 and G163, while the T1 F.F. is again set via gate G156 and gate G152. Gate 161 activates the $\overline{TSC}$ lead to again start the 30.4 second counter in the DIALING CONTROL (FIG. 2), while gate G162 activates the $\overline{SWC}$ lead to switch the inputs to the wait time counters BC6, BC7 in the TEST CONTROL (FIG. 4A) so that they now receive and count the clock pulses from the 940 Hz pulse clock CL 2. Namely, with the lead $\overline{SWC}$ activated, gate G112 is disabled, while gate G113 is enabled via gate G111. The $\overline{MCT}$ lead resets the wait time counters BC6 and BC7 via gate 165 with the T2 F.F. being set and the faster repetition rate 940 Hz pulses are counted. Since the repetition rate of the pulses from clock CL 2 is sufficiently more rapid than that of the pulses from clock CL-1 and the divider flip-flops DF1–DF3, counted by the 30.4 second counter in the DIALING CONTROL (FIG. 2) gate G119 in the TEST CON- TROL (FIG. 4A) will become enables if the system is operating properly.

When the gate G119 is enabled, the lead $\overline{\text{TMPT}}$ sets the RUN F.F. (FIG. 4 B) via gates G159 and G163. When the RUN F.F. is set, the $\overline{\text{TMP}}$ and $\overline{\text{CNU}}$ leads are activated via gates G171 amd G172, respectively. The $\overline{\text{TMP}}$ lead resets the WAIT F.F. and also, via gates G120 – G124 virtually resets the entire ACG. The RUL1, RLT1 and RLT2 leads reset the LATCHING CIRCUITS in the PORT SELECTOR (FIG. 7) while the $\overline{\text{TM}}$ lead resets the LATCHING LAMP DRIVER circuits LDC-1 in the MONITOR PANEL CONTROL (FIG. 9). This operation completes the cycle for the ACG with the second self test completed successfully, and the system is again ready to advance to he first program of the repeated sequence. The CNU lead resets the TEST F.F. (FIG. 4 A) which again enables gate G131.

As was noted above, whenever a call fails to be terminated within the 30.4 second period timed in the DIALING CONTROL (FIG. 2), the TSP lead is activated. As a result, gate G131 will activate the CALL FAIL lead CTO and, for each call failure, CALL FAILURE COUNTER BC8 in the TEST CONTROL (FIG. 4 B) will advance one count. A total of only two failures per cycle causes counter BC8 to activate the TBC lead, which sets the ALARM F.F. via gate G136 to provide an alarm indication on lead MOP, as described previously.

The ACG fails the second self test if the 30.4 second timer finishes before the wait time counters BC6, BC7 which are counting 940 Hz pulses. In this event, the TSP lead is activated, to enable gate G160 and activate SELF TEST FAILED lead $\overline{\text{ALE}}$. Lead $\overline{\text{ALE}}$ then proceeds to generate an alarm as described above for a failure of the first self test.

If the ACG passes both self tests, when the TEST F.F. is rest by the $\overline{\text{CNU}}$ lead, the $\overline{\text{TST}}$ lead is enabled, to again place the wait time counters BC6, BC7 under control of the WAIT TIME F.F. The RUN F.F. also resets counter BC8, via gate G173 and resets the T2 F.F. via gate G170 to deactivate the SWC lead, so that wait time counters BC6, BC7 again will count the DPS pulses via gate G112. Since the WAIT TIME F.F. has been reset by the TMP lead, the $\overline{\text{SPG}}$ lead has been activated by one shot OS1, and the PROGRAM SCANNER BC4 in the PROGRAM CONTROL (FIG. 3C) advances to the first program (0). The $\overline{\text{SPG}}$ also resets the RUN F.F. The ACG now begins a new cycle of programs.

PROGRAM SKIPPED

In the above description, it was assumed that each program was strapped to be run, so that the ACG attempted to place a call for the program. Where a program is to be skipped, the appropriate PGO lead is strapped to its corresponding S (SKIP) lead on the STRAPPING PANEL (FIG. 6A). Then, as the system advances through the programs, whenever a program is to be skipped, the $\overline{\text{SKP}}$ lead will be activated by the gate buffer circuit BG26 in the PROGRAM SELECTOR (FIG. 5C). The $\overline{\text{SKP}}$ lead sets the WAIT F.F. via gates G56 and G55 and resets the TIME F.F. via gates G60. It also lights the SKIP lamp in the MONITOR PANEL (FIG. 10) via the $\overline{\text{L3}}$ output of driver LDC1 in the MONITOR PANEL CONTROL (FIG. 9). As a result, the program is skipped and, at the end of the wait period (1.7 minutes), lead $\overline{\text{TMP}}$ will be activated, to reset the WAIT F.F. and cause one shot OS1 to activate the $\overline{\text{SPG}}$ lead and advance the PROGRAM SCANNER BC4 to the next program.

MANUAL MODE

In lieu of the automatic mode of operation just described, wherein the system runs through the programs continuously and repeatedly, the ACG may be controlled manually from the MONITOR PANEL (FIG. 10) For manual operation, the ON/OFF RESET SWITCH is initially switched to the OFF (RESET) position to clear the system. The PROGRAM NUMBER DIGISWITCH SW5 is then manually advanced to the particular test call program desired. This activates the appropriate BCD leads PS1, PS2, PS4 and PS8 via resistor network RN1, to supply inputs to one side of the digit comparator DGC 1 in the MONITOR PANEL CONTROL (FIG. 9). The PROGRAM SELECT SWITCH SW3 is then switched to the ON position to activate the $\overline{\text{SRL}}$ lead. The $\overline{\text{SRL}}$ lead energizes the pico read relays in relay circuit RB5 to close the contacts in relay contact circuit CB5, whereby digit comparator DGC1 will enable one of the inputs to gate G307. The $\overline{\text{SRL}}$ lead also inhibits the PROGRAM SCANNER (FIG. 3C) from advancing the program count.

The DISPLAY SWITCH SW1 is also switched to the ON position to activate the LED display LED1. Next, the ON/OFF RESET SWITCH SW4 is switched to the ON position and the operation of the ACG is carried out in the same manner as in the automatic mode for an individual one of the programs. If the call fails to terminate within 30.4 seconds, activation of the TSP lead in the DIALING CONTROL (FIG. 2) will enable the other input to gate G309 in the MONITOR PANEL CONTROL (FIG. 9) via gates G306, G307, and G308 to activate the $\overline{\text{SF}}$ lead. The $\overline{\text{SF}}$ lead is connected to amplifier buffer AB1 in the LINE/TRUNK ACCESS (FIG. 8 A) and lead PC3 is activated to advance the electromechanical counter EMC3 on the MONITOR PANEL (FIG. 10). The $\overline{\text{CTO}}$ lead will also activate the $\overline{\text{CLF}}$ lead from the LATCHING LAMP DRIVER LDC-1, via gate G303 in the MONITOR PANEL CONTROL (FIG. 9). Both the TOTAL FAILURES counter EMC2 and the SELECTED FAILURES counter EMC3 on the MONITOR PANEL (FIG. 10) will be advanced one count. As was the case with the automatic mode of operation, two call failures within the sixteen programs will cause the counter BC8 in the TEST CONTROL (FIG. 4B) to have registered two bad calls and activate lead TBC to generate an emergency alarm.

In order to manually operate the self test feature, thumbwheel digiswitch SW5 must be set on program 16 (PG15) since the self test feature is carried out at the end of the last or sixteenth program, as described above. Lamps which were energized at the time of failure remain lighted until the ON/OFF RESET switch SW4 is switched to the OFF position. The ON/OFF RESET switch SW4 must be restored to the ON position to continue operation.

The MONITOR PANEL is also provided with a push button switch SW6 which, when depressed, activates lead $\overline{\text{SWO}}$ so that the wait time counter BC6 – BC7 in the TEST CONTROL (FIG. 4A) can be manually set to advance at a faster rate, through gates G301 and G302 in the MONITOR PANEL CONTROL (FIG. 9).

We claim:

1. A call generator for testing a common control type telephone system having a plurality of call originating circuits and call terminating circuits, and a switch frame by way of which communication paths are established between said call originating and call terminating circuits under control of the common control, said call generator being selectively connectable with selected ones of the call originating and call terminating circuits and comprising first means, coupled to a selected originating circuit port and a selected terminating circuit port, for generating first signals representative of a request for a connection between said originating circuit port and said terminating circuit port;

second means, coupled to said first means, for timing the operation of said first means and for generating a second signal representative of the inability of said common control to effect a communication path between said originating circuit port and said terminating circuit port within a prescribed period of time; and third means, coupled to said first means and said second means, for testing the proper operation of said first and second means, by testing the ability of said first means to generate said first signals and for testing the ability of said second means to time the operation of said first means.

2. A call generator according to claim 1, further including a first clock signal generating means which generates first clock signals at a first prescribed clock rate, and wherein said third means includes means, responsive to the termination of said first signals, for effecting a first self test by causing said first and second means to begin counting said first clock signals, and for generating a signal indicative of a malfunction of said call generator upon the count by said first means reaching a predetermined number prior to the completion of the count of said first clock signals by said second means.

3. A call generator according to claim 2, wherein said second means comprises means for generating said second signal upon the lapse of a prescribed period of time after the termination of said first signals.

4. A call generator according to claim 3, wherein said selected call originating circuits include line circuits and incoming trunk circuits and said selected call terminating circuits include line circuits and outgoing trunk circuits and said first means includes means, coupled to the ports of each of said selected ones of said call originating and call terminating circuits, for generating a sequence of respective first signals representative of requests for connections between a plurality of originating and terminating circuits, including connections from line circuits to line circuits, line circuits to outgoing trunk circuits, and incoming trunk circuits to line circuits, and wherein said second means includes means for generating a third signal in response to the generation of a plurality of second signals for said sequence of first signals.

5. A call generator according to claim 4, wherein said first means comprises means for generating said sequence of first signals in accordance with a defined set of programs, each program corresponding to a request for a connection between a selected originating circuit and a selected terminating circuit, and said third signal generating means generates said third signal in response to the generation of a plurality of second signals within said defined set of programs.

6. A call generator according to claim 5, wherein said first means further includes means for automatically and periodically stepping through the programs of said defined set.

7. A call generator according to claim 6, wherein said second means includes means for monitoring the lapse of said prescribed period of time after the termination of said first signals in accordance with a count of said first clock signals.

8. A call generator according to claim 7, wherein said first means includes means for periodically stepping through the programs of said defined set of said first clock signals beginning with the termination of said first signals and causing said generator to advance to the next program in the set upon the count of said first clock signals reaching a predetermined number.

9. A call generator according to claim 8, wherein said third means, includes means for testing the proper operation of said first and second means upon the completion of a prescribed one of the programs in said set.

10. A call generator according to claim 9, wherein said third means includes means for effecting said first self test upon the termination of said first signals for said prescribed one of the programs in said set.

11. A call generator according to claim 2, wherein said third means further includes second clock generator means which generates second clock signals at a second prescribed clock rate faster than said prescribed clock rate and means, responsive to the completion of said first self test, for causing said first means to begin counting said second clock signals and said second means to begin counting said first clock signals, and for generating a signal indicative of a malfunction of said call generator upon the completion of the count of said first clock signals by said second means occurring prior to the count by said first means of said second clock signals reaching said predetermined number.

12. A call generator according to claim 7, wherein said first means includes means for generating said first signals as a series of digit pulses corresponding to the identification of a selected terminating circuit in accordance with said first clock signals.

13. A call generator according to claim 12, wherein said second means includes means, responsive to the completion of the generation of the series of digit pulses corresponding to the identification of the selected terminating circuit for that program, for starting the monitoring of the lapse of said prescribed period of time in accordance with a count of said first clock signals.

14. A call generator according to claim 13, wherein said second means includes means for resetting said monitoring means upon the selected originating circuit being connected to the selected terminating circuit for that program within said prescribed period of time.

15. A call generator according to claim 11, wherein said second means includes timing circuit means, normally coupled to receive the second clock signals from said second clock generator means, and gate means, responsive to a signal representative of a malfunction of said call generator or said second signal representative of the inability of said common control to effect a communication path between said originating circuit port and said terminating circuit port within said prescribed period of time, for preventing said timing circuit means from receiving said second clock signals, whereby a system alarm signal will be generated.

16. A call generator according to claim 6, further including means for causing said first means to selectively generate first signals for only a selected one of the programs of said defined set, so that only said selected program may be carried out by said call generator.

17. A call generator according to claim 6, further including means for selectively causing said first means to by-pass at least one of the programs in said defined set.

* * * * *